(12) United States Patent
Desai et al.

(10) Patent No.: US 11,039,297 B1
(45) Date of Patent: Jun. 15, 2021

(54) DSDS WI-FI CALLING ENHANCEMENTS

(71) Applicant: Apple Inc., Cupertino, CA (US)

(72) Inventors: Sweta B. Desai, San Jose, CA (US); Abhishek Walia, New York, NY (US); Ajoy K. Singh, Milpitas, CA (US); Bhanu Prasad Pamidi, San Jose, CA (US); Rohit Thareja, Pacifica, CA (US); Sharad Garg, Cupertino, CA (US); Vijay Gadde, San Jose, CA (US); Vijendrakumar K. Ashiwal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/802,139

(22) Filed: Feb. 26, 2020

(51) Int. Cl.
*H04W 36/00* (2009.01)
*H04B 1/38* (2015.01)
(Continued)

(52) U.S. Cl.
CPC ......... *H04W 8/183* (2013.01); *H04L 65/1016* (2013.01); *H04M 7/0081* (2013.01);
(Continued)

(58) Field of Classification Search
CPC ............... H04W 4/16; H04W 28/0236; H04W 36/0005; H04W 36/0016; H04W 36/0022;
(Continued)

(56) References Cited

U.S. PATENT DOCUMENTS 8,488,554 B2 * 7/2013 Yan .................. H04W 36/0033
370/331
8,594,670 B2  11/2013 Chin
(Continued)

FOREIGN PATENT DOCUMENTS

| EP | 3 149 988 B1 | 5/2019 |
|---|---|---|
| WO | WO2017012532 A1 | 1/2017 |
| WO | WO2019143044 A1 | 7/2019 |

OTHER PUBLICATIONS

Sangisetta, B.R.; Pabboju, S.; Racha, S.; "Smart Call Forwarding and Conditional Signal Monitoring in Duos Mobile"; ICAICR '19: Proceedings of the Third International Conference on Advanced Informatics for Computing Research; Shimla, H.P, India; Jun. 15-16, 2019; Article No. 1; pp. 1-11.

*Primary Examiner* — Quochien B Vuong
(74) *Attorney, Agent, or Firm* — Kowert, Hood, Munyon, Rankin & Goetzel, P.C.

(57) ABSTRACT

Apparatuses, systems, and methods for enhancement of Wi-Fi calling for DSDS user equipment devices (UEs). The UE may register a first connection supported by a first SIM with IMS for VoWiFi based on a determination to prefer VoWiFi for the first SIM. The first SIM may be associated with a first subscription to a first RAN. The UE may include a second SIM that may be associated with a second subscription to a second RAN. The UE may register a second connection associated with the second SIM with the IMS for VoWiFi and/or VoLTE and initiate/receive, via the first connection supported by the first SIM, a VoWiFi call. A recommendation to handover the VoWiFi call from Wi-Fi to cellular data may be received and, based, at least in part, on the recommendation, the UE may register a second connection associated with the second SIM for IWLAN over cellular data.

20 Claims, 17 Drawing Sheets

(51) Int. Cl.
*H04W 8/18* (2009.01)
*H04W 88/06* (2009.01)
*H04L 29/06* (2006.01)
*H04M 7/00* (2006.01)
*H04W 4/16* (2009.01)
*H04W 48/18* (2009.01)

(52) U.S. Cl.
CPC ......... *H04W 4/16* (2013.01); *H04W 36/0022* (2013.01); *H04W 48/18* (2013.01); *H04W 88/06* (2013.01)

(58) Field of Classification Search
CPC . H04W 36/0058; H04W 36/14; H04W 36/18; H04W 36/24; H04W 36/30; H04W 36/305; H04W 48/18; H04W 72/085; H04W 76/16; H04W 84/12; H04W 88/06; H04W 88/10; H04W 8/183; H04B 17/318; H04B 17/382; H04M 1/2535; H04M 15/8038; H04M 2207/18; H04L 65/1016

See application file for complete search history.

(56) References Cited

U.S. PATENT DOCUMENTS

| | | | |
|---|---|---|---|
| 8,761,788 B2 | 6/2014 | Rajurkar | |
| 9,319,959 B2* | 4/2016 | White | H04W 36/14 |
| 9,635,589 B2* | 4/2017 | Singh | H04W 36/0016 |
| 9,775,022 B1* | 9/2017 | Sahu | H04W 76/16 |
| 9,853,777 B2 | 12/2017 | Sharma | |
| 9,949,172 B2* | 4/2018 | Sridhar | H04W 36/24 |
| 9,967,808 B2* | 5/2018 | Chuttani | H04W 4/021 |
| 10,027,719 B2* | 7/2018 | Osterlund | H04W 80/04 |
| 10,085,274 B2* | 9/2018 | Shi | H04W 68/005 |
| 10,278,106 B2* | 4/2019 | Bollapalli | H04L 65/00 |
| 10,757,629 B2* | 8/2020 | Faus Gregori | H04W 36/0038 |
| 2015/0350983 A1 | 12/2015 | Kwok | |
| 2019/0110236 A1 | 4/2019 | Huang | |
| 2019/0306898 A1 | 10/2019 | Goddeti | |

\* cited by examiner

DSDS WI-FI CALLING ENHANCEMENTS

FIELD

The present application relates to wireless devices, and more particularly to apparatuses, systems, and methods for enhancement of Wi-Fi calling for dual-SIM-dual standby (DSDS) user equipment devices (UEs).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for enhancement of Wi-Fi calling for dual-SIM/dual standby (DSDS) user equipment devices (UEs).

In some embodiments, a wireless device, e.g., such as a user equipment device (UE), may be configured to register a first connection supported by a first subscriber identity module (SIM) with an Internet protocol (IP) Multimedia Core Network Subsystem (IMS) for voice over Wi-Fi (VoWiFi) based on a determination to prefer VoWiFi for the first SIM. The first SIM may be associated with a first subscription to a first radio access network (RAN). The UE may include a second SIM that may be associated with a second subscription to a second RAN. The UE may register a second connection associated with the second SIM with the IMS for VoWiFi and/or for voice over LTE (VoLTE). The UE may initiate and/or receive, via the first connection supported by the first SIM, a VoWiFi call. A recommendation to handover the VoWiFi call from Wi-Fi to cellular data may be received and, based, at least in part, on the recommendation, a second connection associated with the second SIM may be registered for interworking wireless local area network (IWLAN) over cellular data.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
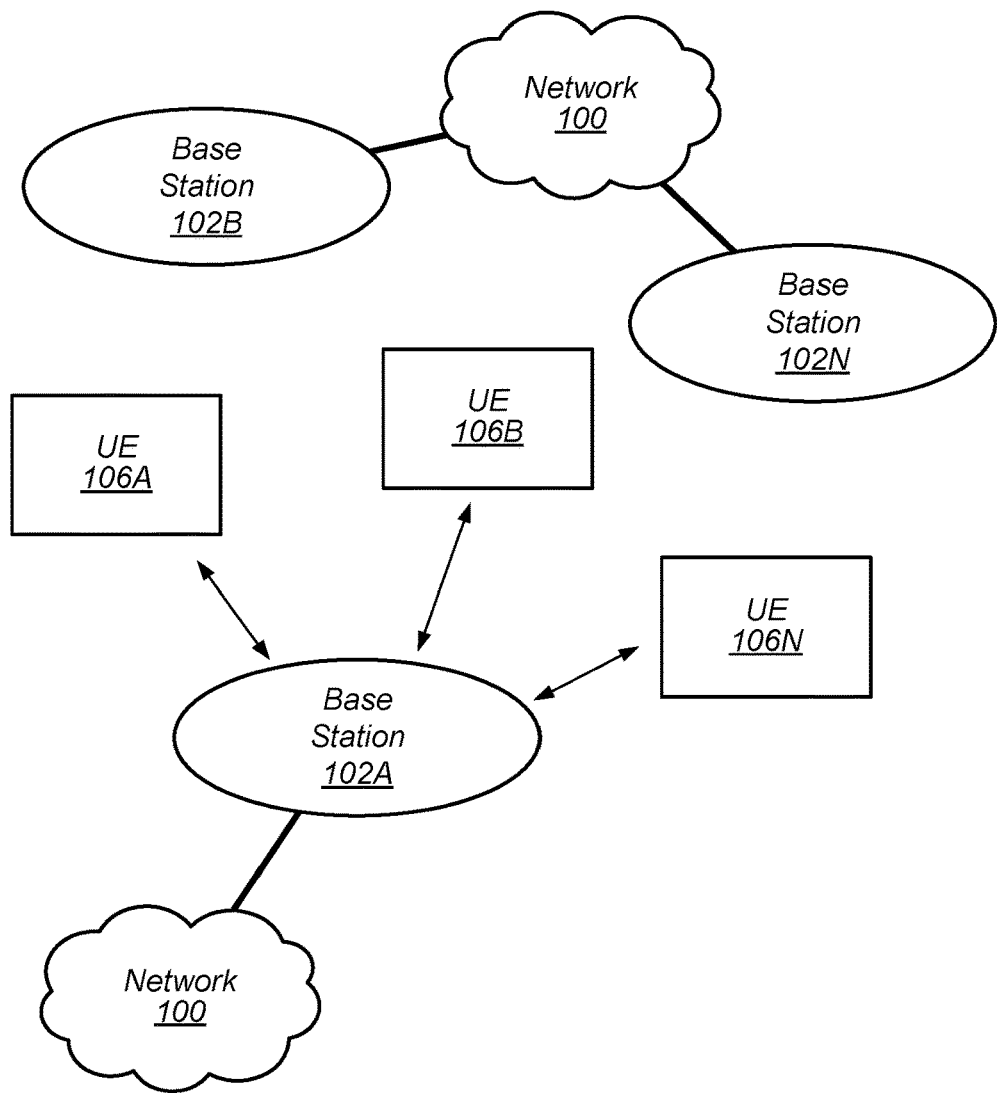
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive
DSDA: Dual SIM/Dual Active
DSDS: Dual SIM/Dual Standby
IKEv2: Internet Key Exchange
MOBIKE: Mobility and Multihoming extension to IKEv2
IWLAN: Interworking Wireless LAN

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

MOBIKE—refers to a protocol defined by RFC 4555 (2006-06-01) that allows the IP addresses associated with Internet Key Exchange version 2 (IKEv2) and tunnel mode IPsec Security Associations to change. A mobile Virtual Private Network (VPN) client may use MOBIKE to keep the connection with the VPN gateway active while moving from one address to another. Similarly, a multihomed host could use MOBIKE to move the traffic to a different interface if, for instance, the one currently being used stops working.

IWLAN—refers to the Interworking Wireless LAN (IWLAN) architecture. The IWLAN architecture allows the transfer of IP data between a mobile device and operator's core network through Wi-Fi access. In the IWLAN architecture, a mobile device may open a VPN/IPsec tunnel from the wireless device to the dedicated IWLAN server in the operator's core network (CN) to provide the wireless device either an access to the operator's walled-garden services or to a gateway to the public Internet.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
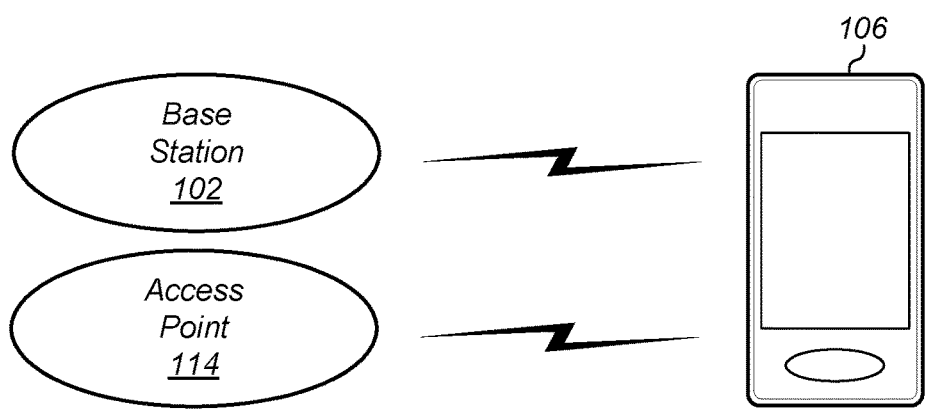
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
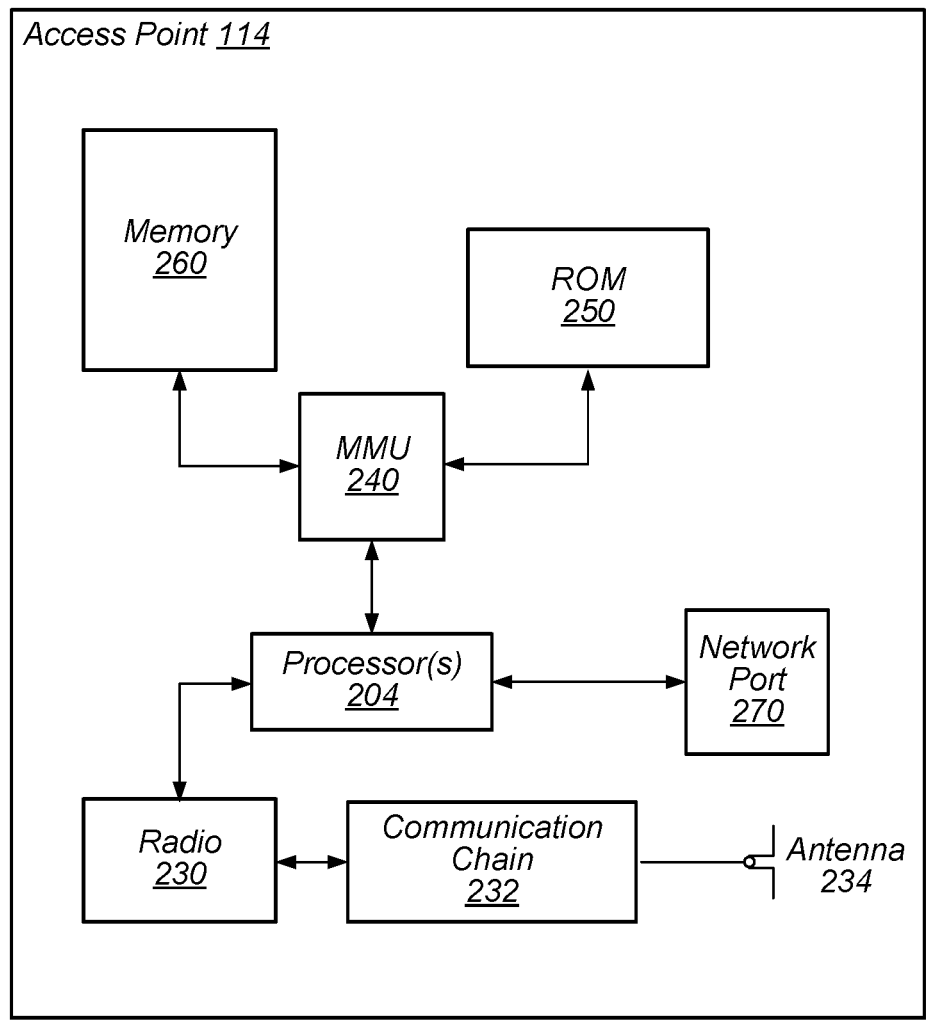
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for enhancement of Wi-Fi calling for DSDS UEs as further described herein.

Figure 3:
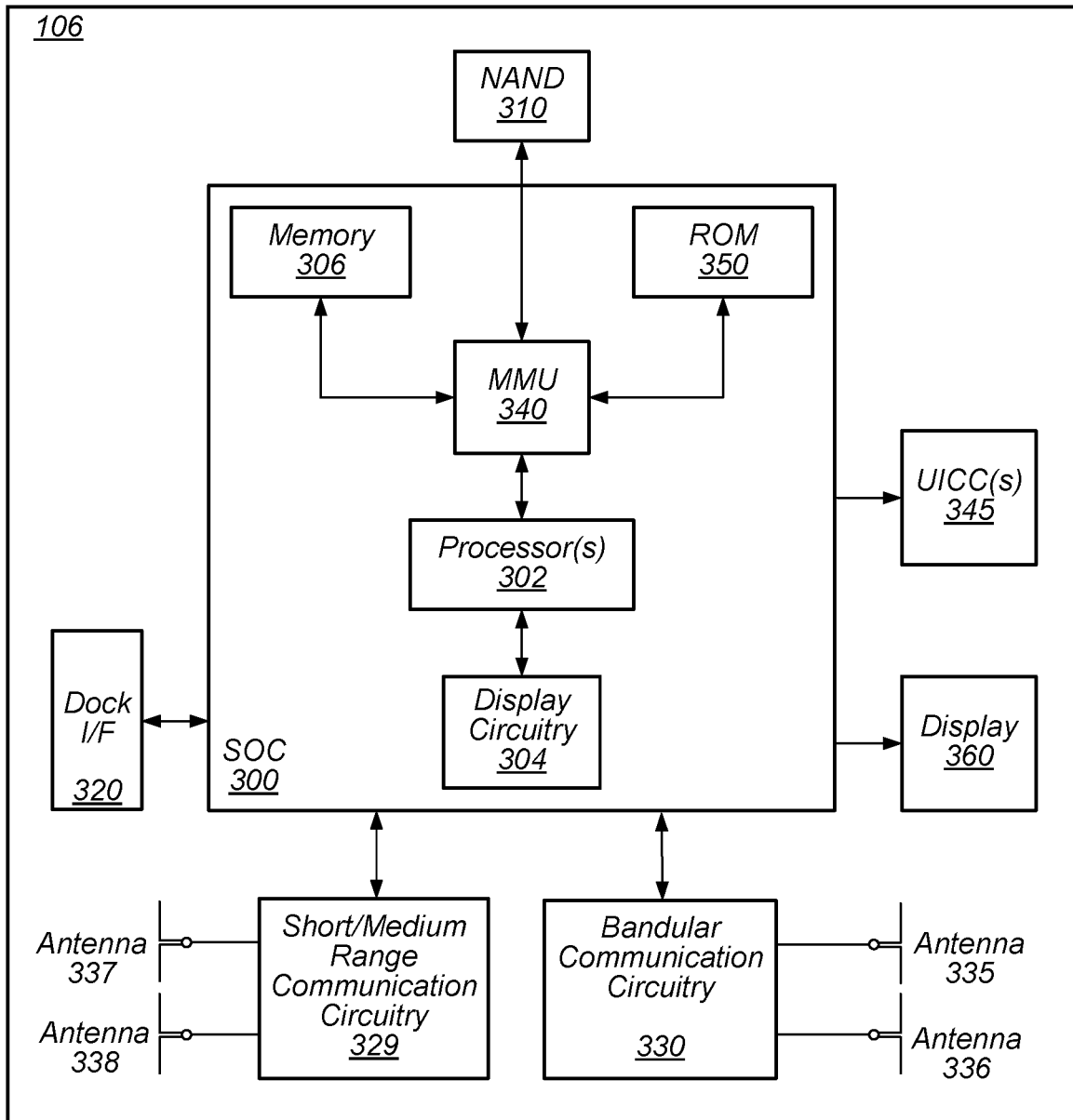
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. The term "SIM" or "SIM entity" is intended to include any of various types of SIM implementations or SIM functionality, such as one or more UICC(s) (Universal Integrated Circuit Card(s)) cards, one or more eUICCs, one or more eSIMs, either removable or embedded, etc. In some embodiments, the UE 106 may include at least two SIMs 345. Each SIM may execute one or more Subscriber Identity Module (SIM) applications and/or otherwise implement SIM functionality. Thus, each SIM 345 may be a single smart card that may be embedded, e.g., may be soldered onto a circuit board in the UE 106, or each SIM 345 may be implemented as a removable smart card. Thus the SIM(s) 345 may be one or more removable smart cards (such as UICC cards, which are sometimes referred to as "SIM cards"), and/or the SIMs 345 may be one or more embedded cards (such as embedded UICCs (eUICCs), which are sometimes referred to as "eSIMs" or "eSIM cards"). In some embodiments (such as when the SIM(s) 345 include an eUICC), one or more of the SIM(s) 345 may implement embedded SIM (eSIM) functionality; in such an embodiment, a single one of the SIM(s) 345 may execute multiple SIM applications. Each of the SIMs 345 may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may include two embedded SIMs 345, two removable SIMs 345, and/or a combination of one embedded SIMs 345 and one removable SIMs 345. Various other SIM configurations are also contemplated.

As noted above, in some embodiments, the UE 106 may include two or more SIMs. The inclusion of two or more SIMs 345 in the UE 106 may allow the UE 106 to support two different telephone numbers and may allow the UE 106 to communicate on corresponding two or more respective networks. For example, a first SIM 345 may support a first RAT such as LTE, and a second SIM 345 support a second RAT such as 5G NR, LTE, and/or UMTS. Other implementations and RATs are of course possible. Where the UE 106 includes two SIMs 345, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology. In another embodiment, the UE 106 may support Dual SIM Dual Standby (DSDS) functionality. The DSDS functionality may allow either of the two SIMs 345 in the UE 106 to be on standby waiting for a voice call and/or data connection. In DSDS, when a call/data is established on one SIM 345, the other SIM 345 is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for enhancement of Wi-Fi calling for DSDS UEs as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
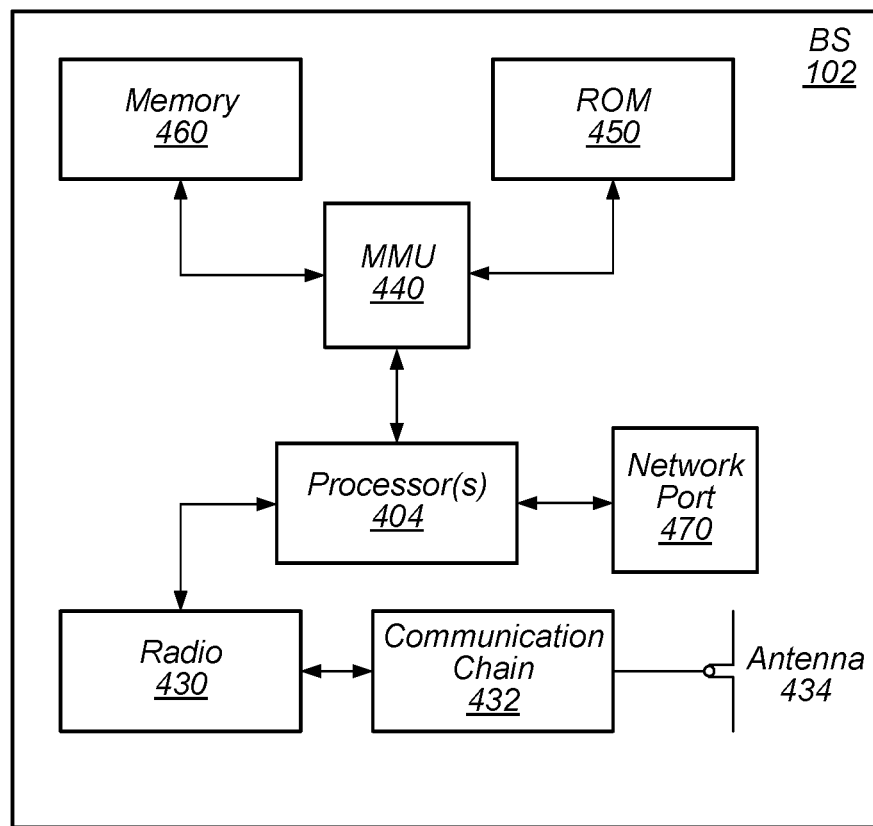
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5A:
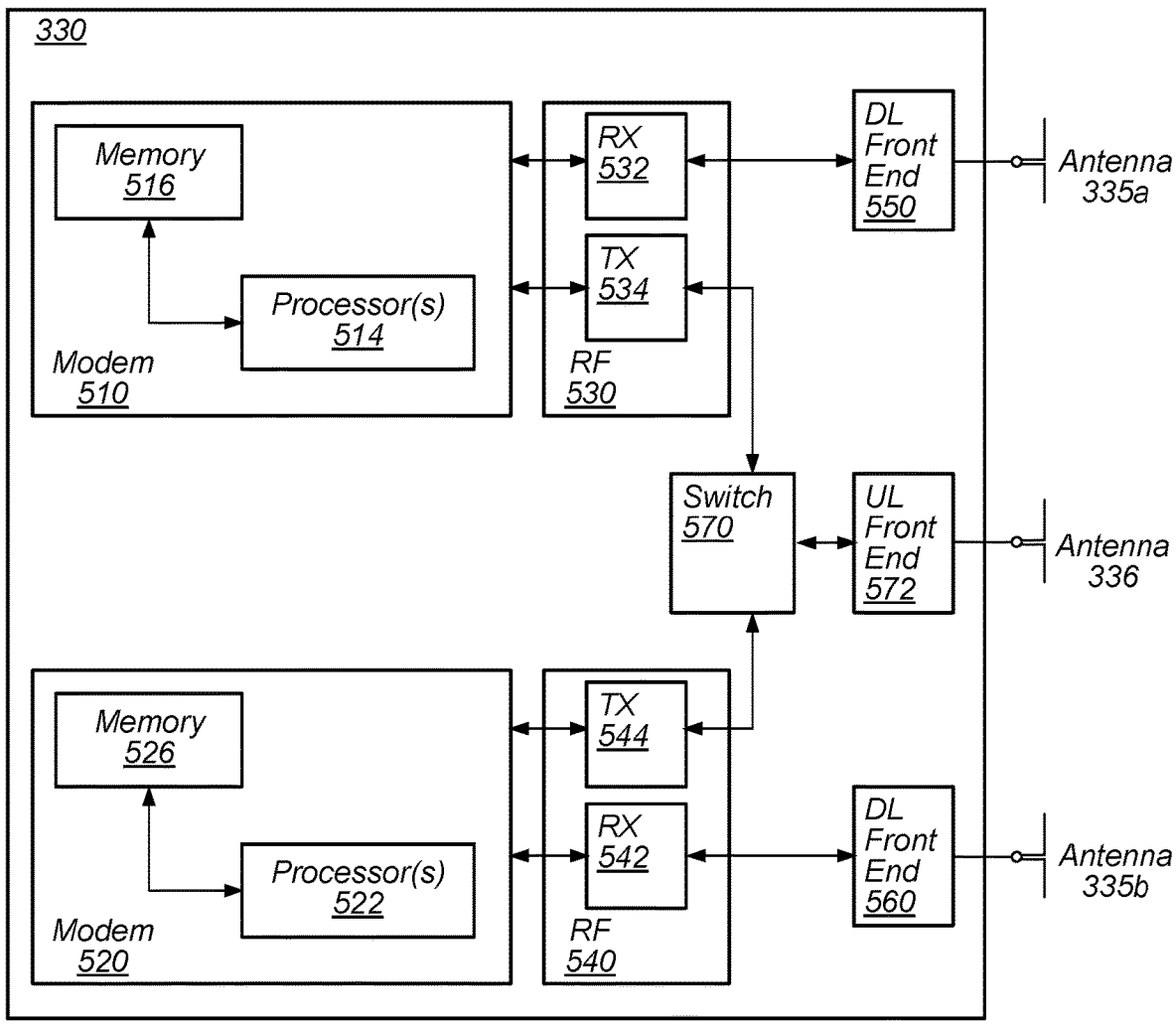
FIGS. 5A-5C illustrate examples of block diagrams of cellular communication circuitry in the UE, according to some embodiments.
Figure 5B:
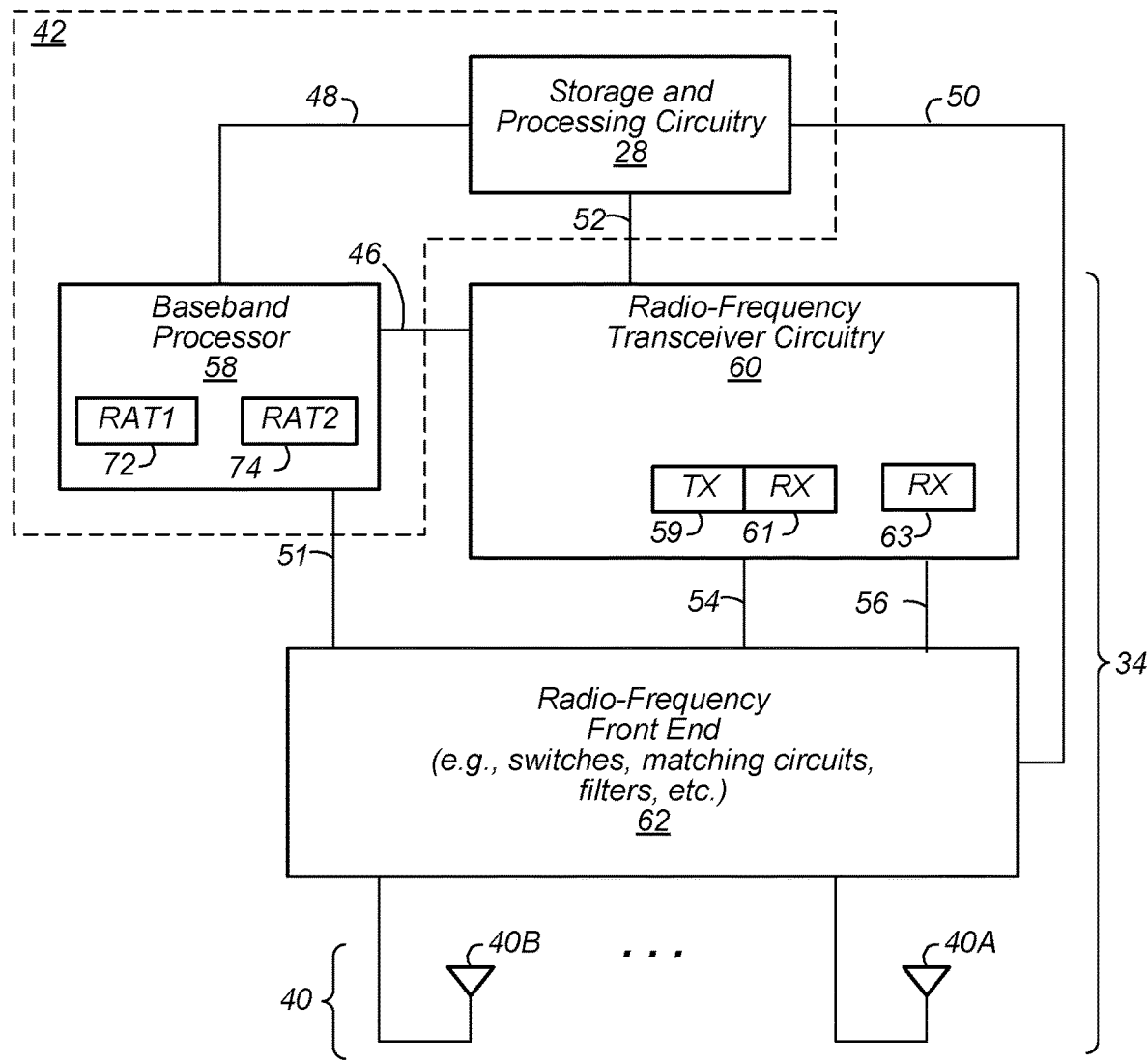
Figure 5C:
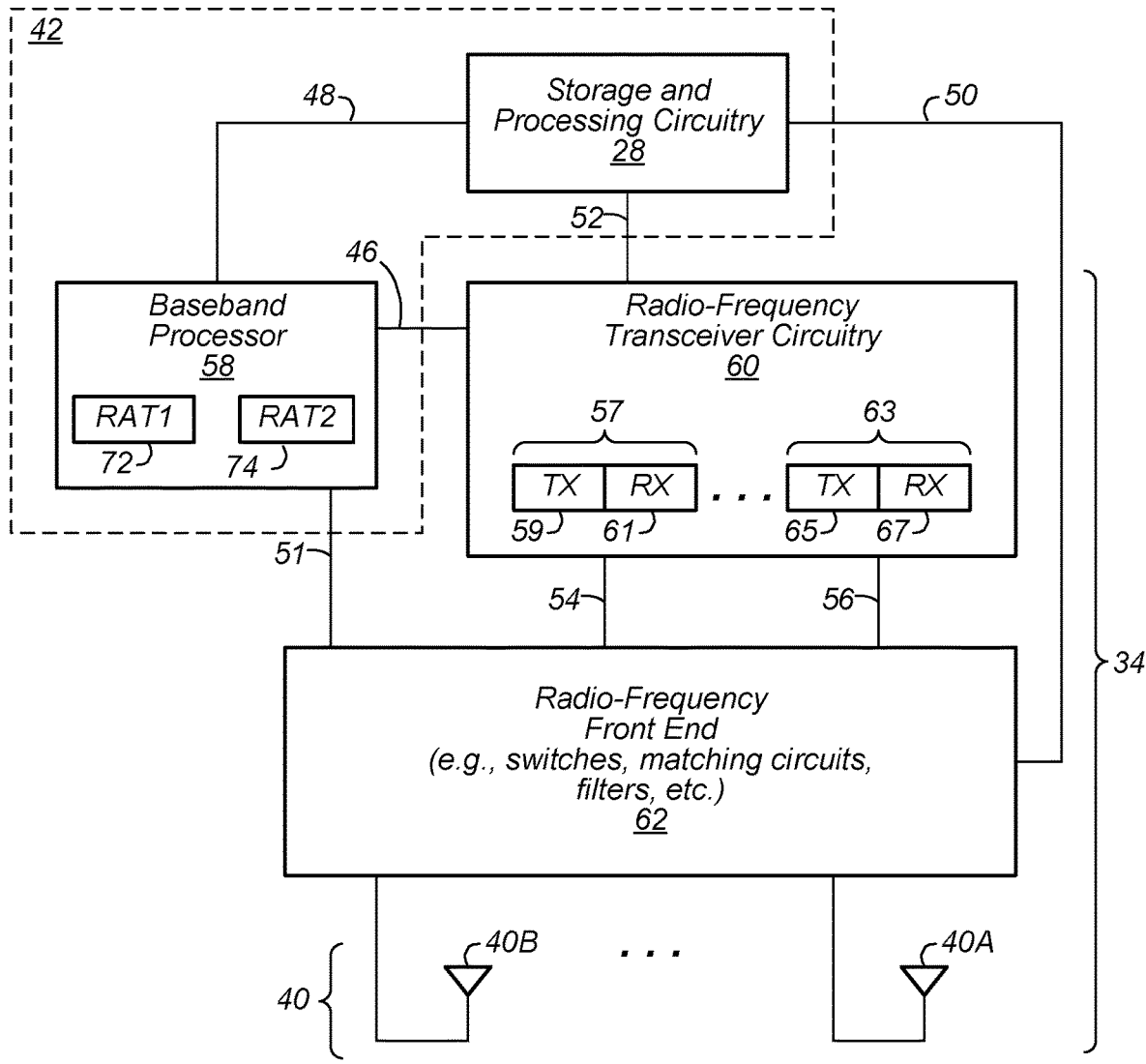

FIGS. 5A-5C: Block Diagrams of Cellular Communication Circuitry

FIG. 5A illustrates an example simplified block diagram of cellular communication circuitry, according to some embodiments. It is noted that the block diagram of the cellular communication circuitry of FIG. 5A is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for enhancement of Wi-Fi calling for DSDS UEs as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

FIG. 5B illustrates a portion of a UE, such as UE 106, according to some embodiments. As shown, the UE may include control circuitry 42 that may be configured to store and execute control code for implementing control algorithms in the UE. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (e.g., baseband processor 58 may be considered to form part of the storage and processing circuitry of UE). Baseband processor 58 may include software and/or logic for handling various different RATs, such as RAT1 logic 72 and RAT2 logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 includes transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus, the TX chain 59 and the two RX chains 61 and 63 may be considered, along with other necessary circuitry, as a single radio. Other embodiments are of course contemplated. For example, the radio-frequency transceiver circuitry 60 may include only a single TX chain and only a single RX chain, also a single radio embodiment. Thus the term "radio" may be defined to have the broadest scope of its ordinary and accepted meaning, and includes the circuitry normally found in a radio, including, but not limited to, either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may include their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5C, the radio-frequency transceiver circuitry 60 may also include two or more TX chains and two or more RX chains, according to some embodiments. For example, FIG. 5C shows an embodiment with a first radio 57 including TX chain 59 and RX chain 61 and a second radio 63 including a first TX chain 65 and a second TX chain 67. Embodiments are also contemplated where additional TX/RX receive chains may be included in the embodiment of FIG. 5B, e.g., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE. For example, as shown in FIG. 5B, in normal LTE and/or 5G NR operations, antennas 40A and 40B may be used with respective receivers 61 and 63 to implement a receive diversity scheme, such as for MIMO operations. With this type of arrangement, two LTE data streams, two 5G NR data streams, and/or a combination of LTE and 5G NR data streams may be simultaneously received and processed using baseband processor 58. When it is desired to monitor a paging channel for incoming pages, one or both of the antennas may be temporarily used in receiving paging channel signals.

Control circuitry 42 may be used to execute software for handling more than one radio access technology. For example, baseband processor 58 may include memory and control circuitry for implementing multiple protocol stacks such as an LTE protocol stack 72 and a 5G NR protocol stack 74. Thus, protocol stack 72 may be associated with a first radio access technology such as LTE (as an example), and protocol stack 74 may be associated with a second radio access technology such as 5G NR (as an example). During operation, the UE may use LTE protocol stack 72 to handle LTE functions and may use 5G NR protocol stack 74 to handle 5G NR functions. Additional protocol stacks, additional transceivers, additional antennas 40, and other additional hardware and/or software may be used in UE if desired. The arrangement of FIGS. 5B and 5C is merely illustrative. In some embodiments, one or both of the protocol stacks may be configured to implement the methods described in the flowcharts below.

In some embodiments of FIG. 5B (or 5C), the cost and complexity of UE may be minimized by implementing the wireless circuitry of FIG. 5B (or 5C) using an arrangement in which baseband processor 58 and radio-transceiver circuitry 60 are used to support both LTE and 5G NR traffic.

5G NR Architecture with LTE

Figure 6A:
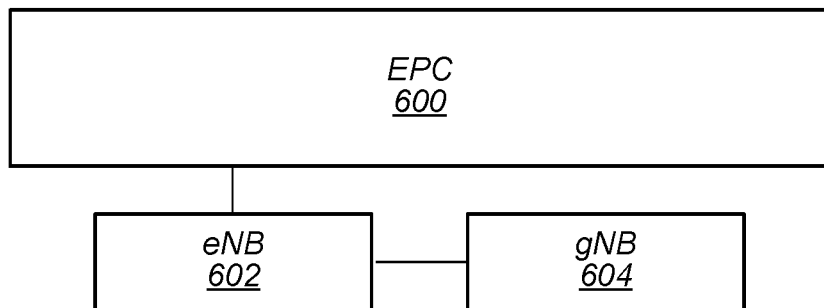
FIG. 6A illustrates an example of connections between an EPC network, an LTE base station (eNB), and a 5G NR base station (gNB).
Figure 6B:
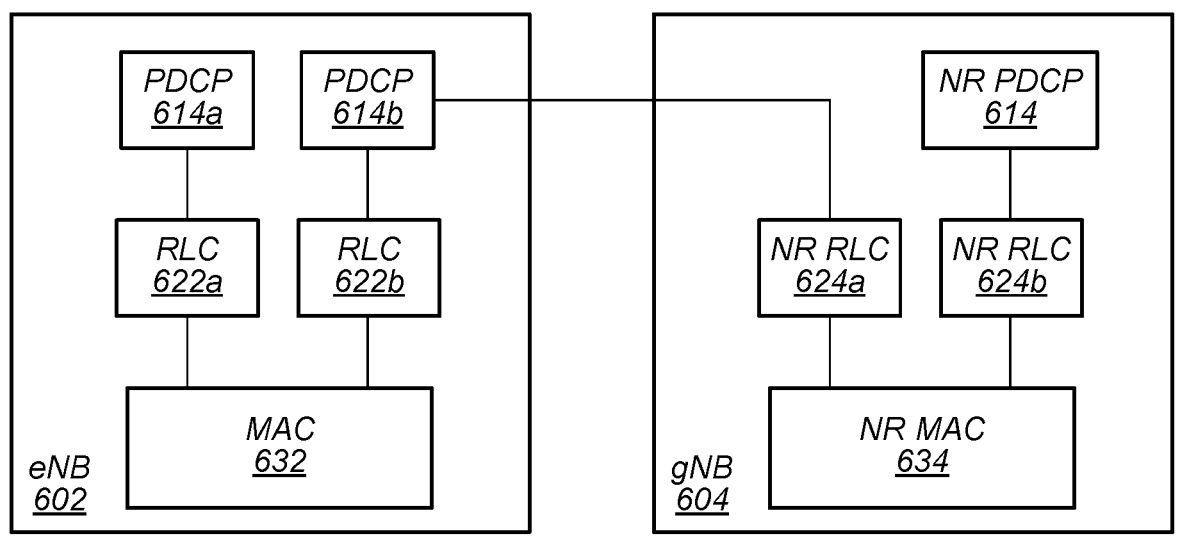
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG)

bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
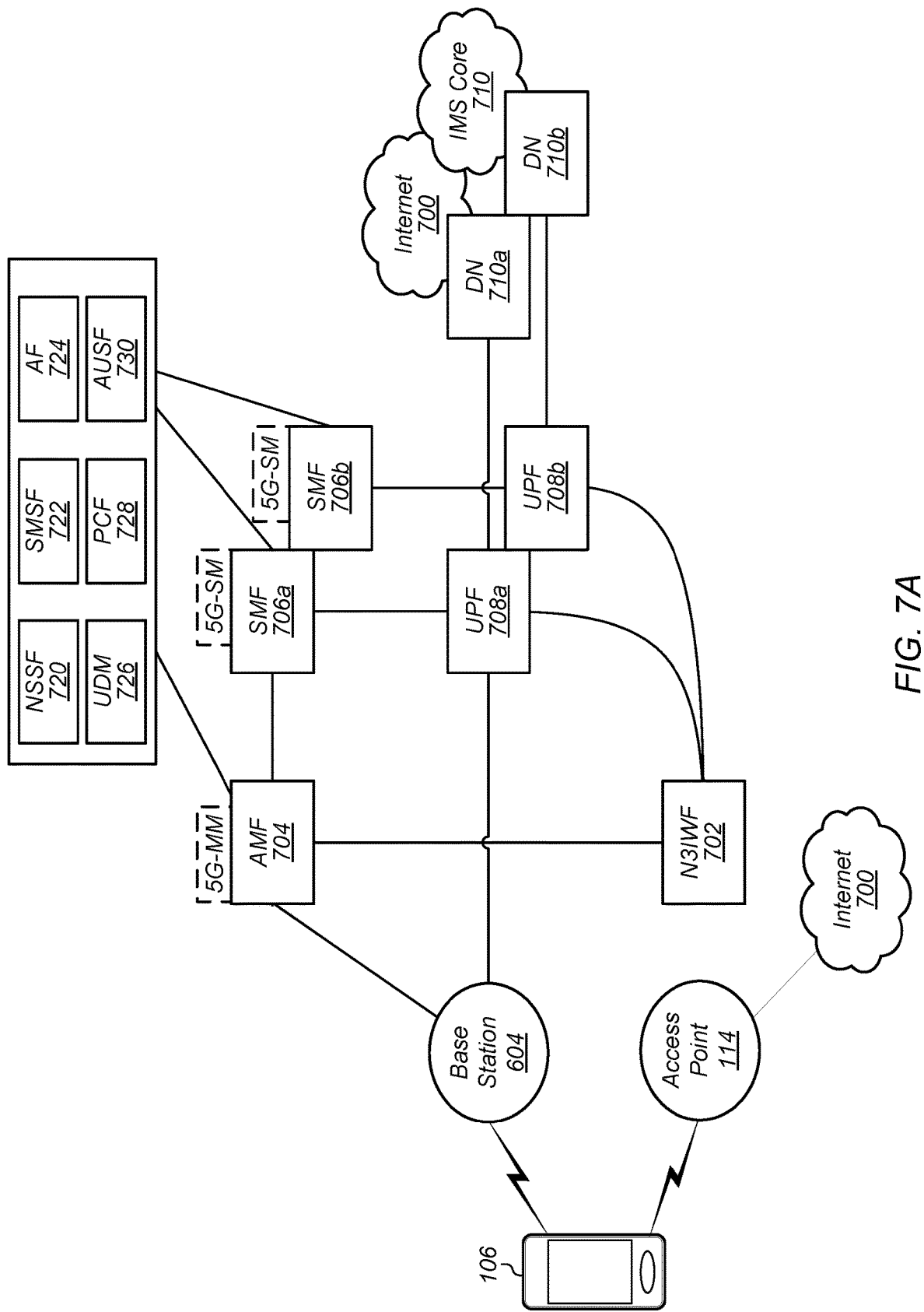
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
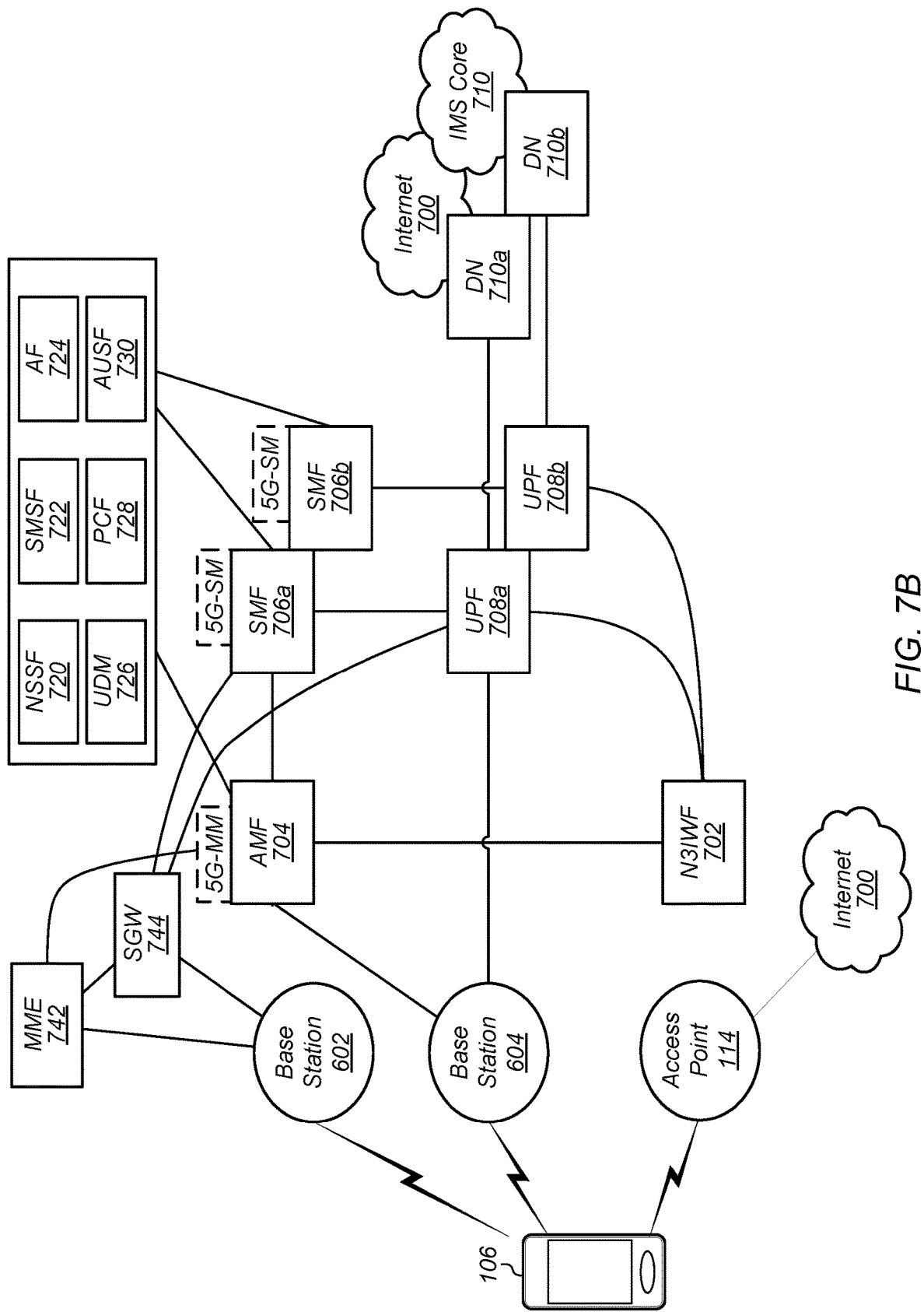
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured for enhancement of Wi-Fi calling for DSDS UEs, e.g., as further described herein.

Figure 8:
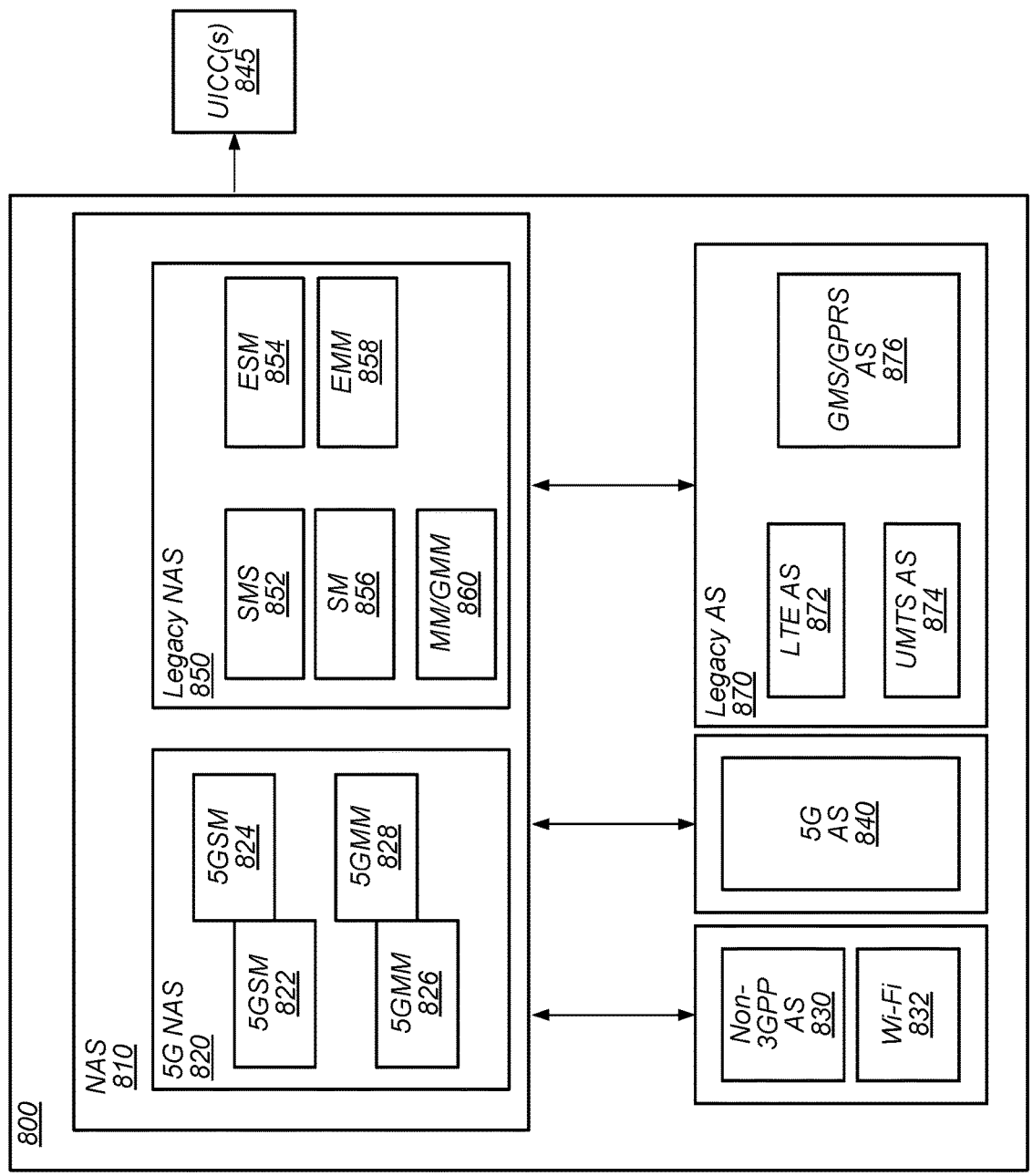
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for enhancement of Wi-Fi calling for DSDS UEs, e.g., as further described herein.

Voice Over Wi-Fi Calls

In current implementations, a dual SIM device configured with dynamic data switching and Wi-Fi Calling enabled (e.g., voice over Wi-Fi (VoWiFi)) may encounter a scenario in which both SIMs may have VoWiFi calls, with one of the SIMs supporting an active call and one of the SIMs supporting a held call. In such a scenario, when Wi-Fi degrades and/or becomes unavailable, one of the calls may be dropped (ended) upon an attempt to simultaneously handover the VoWiFi calls to VoLTE. For example, upon Wi-Fi degrading and/or becoming unavailable, an iRAT manager may recommend handover to cellular (e.g., VoLTE) for both SIMs and the SIMs may compete for baseband processor (e.g., cellular) resources. Thus, IMS PDP activation over cellular may be initiated for both SIMs, however, since one of the SIMs is supporting an active call, its associated IMS PDP may be handed over to cellular (e.g., VoLTE). For the held call, the iRAT manager may detect the cellular call and may recommend handover to IWLAN for the held call. However, such a handover may fail because IMS PDP activation may be ongoing for the held call. The IMS PDP activation may fail of the held call because of the ongoing cellular call and, as a result, the held call may drop because of handover failure.

In another scenario, one of SIMs may have a VoWiFi call and one of SIMs may have a VoLTE call, with one of the SIMS supporting an active call and one of the SIMs supporting a held call. In such a scenario, when Wi-Fi degrades and/or becomes unavailable, the VoWiFi call may be dropped (ended) upon an attempt to handover the VoWiFi call to VoLTE and/or cellular. For example, upon Wi-Fi degrading and/or becoming unavailable, there may be no handover support for VoWiFi call (e.g., due to a lack of MOBIKE support) and the held call may drop.

Embodiments described herein provide systems, method, and mechanisms for enhancement of Wi-Fi calling (VoWiFi) for a UE, such as UE 106. In some embodiments, the UE may be a multi-SIM device and/or may support multiple SIM profiles. In some embodiments, the UE may operate in a dual-SIM/dual-standby (DSDS) mode of operation. In some embodiments, the UE (and/or a network operator servicing the UE) may be configured to support the Mobility and Multihoming extension to IKEv2 (MOBIKE) protocol.

In some embodiments, a wireless radio manager (WRM) module included on (and/or implemented by a processor of) a UE, such as UE 106, may determine, based on Wi-Fi availability, to recommend voice over Wi-Fi (VoWiFi) for a first SIM (and/or SIM profile) and for a second SIM (and/or SIM profile). Thus, both the first SIM and the second SIM may be IMS registered over Wi-Fi. Note that the WRM module may provide recommendations for VoWiFi versus VoLTE as well as Wi-Fi vs cellular data. In some embodiments, a communications module may receive and honor recommendations from the WRM module regarding VoWiFi/VoLTE. Additionally, in some embodiments, the communications module may subscribe to WRM module recommendations regarding Wi-Fi/cellular data. In some embodiments, the first SIM may have an active call via VoWiFi while the second SIM may be idle. Further, as the UE moves from (and/or to a boundary of) Wi-Fi service and to a cellular support service area, Wi-Fi signals may begin to degrade. Hence, the WRM module may recommend the first SIM handover to cellular. Based on the recommendation, the communications module may deregister the second SIM from IWLAN over Wi-Fi (VoWiFi) and register to IWLAN over cellular using the first SIM's cellular data. In some embodiments, if (when) the first SIM does not have cellular availability, the second SIM may be deregistered from IWLAN over Wi-Fi (VoWiFi) and register to IWLAN over cellular using its own (second SIM) data. Thus, embodiments may allow active calls on both SIMs (one active and one held) where one is VoWiFi and other is IWLAN over cellular data.

In some embodiments, if (when) both SIMs support VoLTE, a VoWiFi call on the first SIM may be handed over to VoLTE and the second SIM may be unaffected. In some embodiments, if (when) the first SIM supports VoLTE and the second SIM does not support VoLTE, a VoWiFi call on the first SIM may be handed over to VoLTE and the second SIM may be unaffected. In some embodiments, if (when) the first SIM does not support VoLTE and the second SIM does support VoLTE, a VoWiFi call on the first SIM may follow a legacy behavior and the second SIM may handover (upgrade) to VoLTE. In some embodiments, if (when) neither SIM supports VoLTE, the first SIM may follow a legacy behavior while the second SIM may be unaffected.

Figure 9:
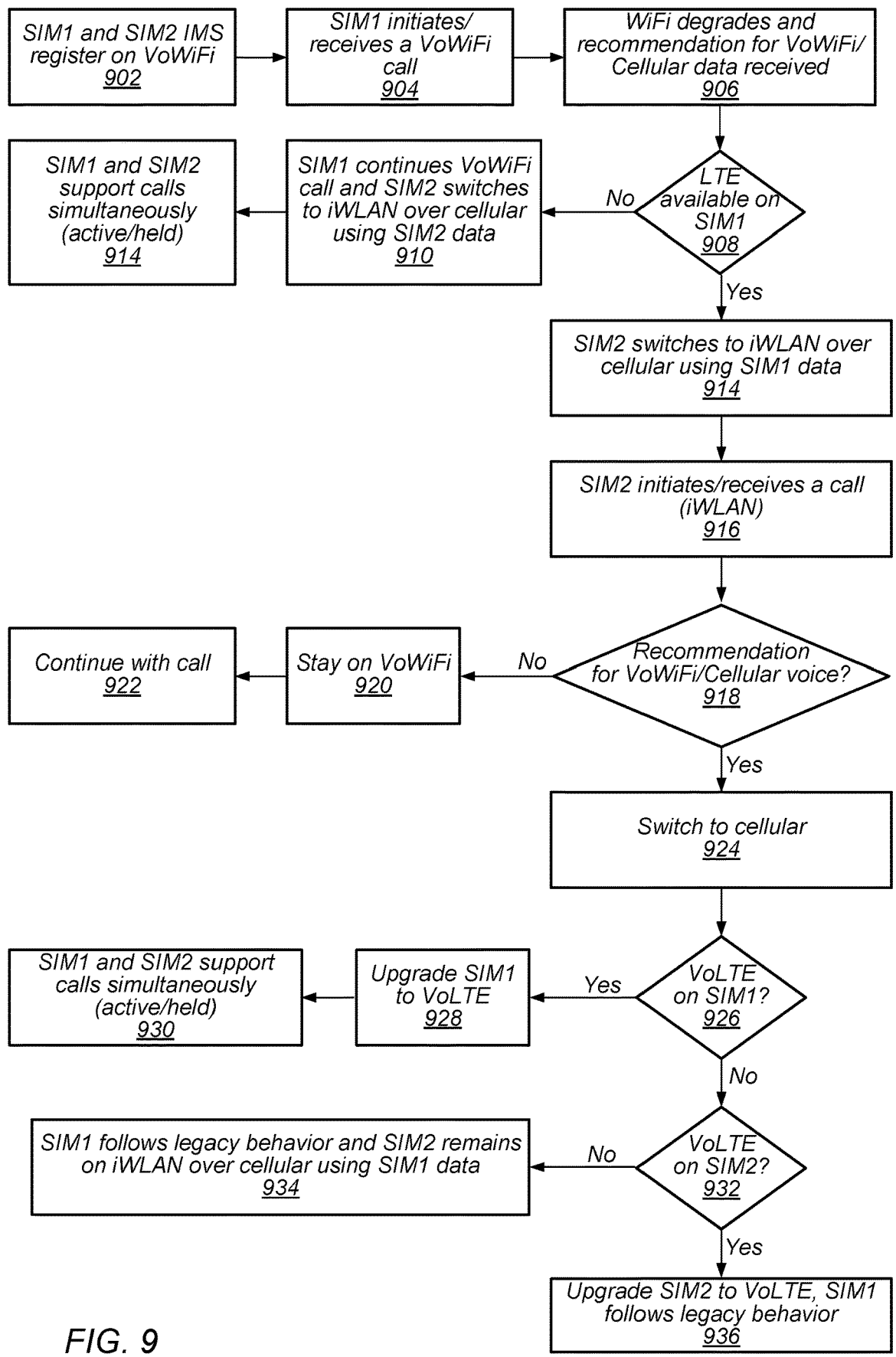
FIGS. 9-13 illustrate block diagrams of examples of methods for a UE to maintain an active VoWiFi call when Wi-Fi degrades, according to some embodiments.

For example, FIG. 9 illustrates a block diagram of an example of a method for a UE to maintain an active VoWiFi call when Wi-Fi degrades, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a UE, such as UE 96, may support and/or include multiple SIMs (and/or multiple SIM profiles) IMS registered on VoWiFi. For example, a first SIM (e.g., SIM1) of the UE may be IMS registered on VoWiFi and may access a first operator radio access network (e.g., RAN1) and a second SIM (e.g., SIM2) of the UE may be IMS registered on VoWiFi and may access a second operator RAN (e.g., RAN2). In some embodiments, neither RAN1 or RAN2 may support MOBIKE. The UE may be connected to a core network of the first operator RAN (e.g., RAN1) via a Wi-Fi connection (and/or additionally via a cellular connection).

At 904, a VoWiFi call may be initiated/received on SIM1. In other words, the UE may receive/initiate a VoWiFi call supported by the first SIM, e.g., a subscription and/or profile associated with the first SIM (e.g., SIM1).

At 906, the Wi-Fi connection (signal) supporting the VoWiFi may degrade. In some embodiments, a communications module may receive, from a WRM module, a recommendation for VoWiFi versus cellular data. In other words, the WRM module may recommend that SIM1 hand over the VoWiFi call to cellular.

At 908, the UE may determine whether LTE is available for the first operator RAN (e.g., RAN1) supporting SIM1. In other words, the UE may determine whether a cell the UE is camping on and/or attempting to camp on supports LTE.

At 910, in response to determining that the first operator RAN does not have LTE available, the UE may continue the VoWiFi call using a cellular data connection to the first operator RAN. Additionally, the UE may deregister the second SIM (SIM2) from IWLAN over Wi-Fi and hand over the second SIM to IWLAN over cellular using a cellular data connection to the second operator RAN.

At 912, the UE may continue to support calls on the first SIM (e.g., SIM1 has an active call) and the second SIM (e.g., SIM2 has a held call).

Alternatively, at 914, in response to determining that the first operator RAN does support LTE, the UE may deregister the second SIM (e.g., SIM2) from IWLAN over Wi-Fi and hand over the second SIM to IWLAN over cellular using the cellular data connection to the first operator RAN.

At 916, the second SIM may initiate and/or receive a call over IWLAN via the cellular data connection to the first operator RAN.

At 918, the UE may determine whether the Wi-Fi connection (signal) supporting the VoWiFi is degrading. In some embodiments, a communications module may receive, from a WRM module, a recommendation for VoWiFi versus cellular voice. In other words, the WRM module may recommend that SIM1 hand over the VoWiFi call to cellular.

At 920, in response to determining that the Wi-Fi connection supporting the VoWiFi call is not degrading, the UE may stay on VoWiFi and, at 922, continue the call via VoWiFi.

At 924, in response to determining that the Wi-Fi connection supporting the VoWiFi call is degrading, the UE may switch the first SIM (e.g., SIM1) to a cellular connection.

At 926, the UE may determine whether LTE is available for the first operator RAN (e.g., RAN1) supporting SIM1. In other words, the UE may determine whether a cell the UE is camping on and/or attempting to camp on supports LTE.

At 928, in response to determining that the first operator RAN does support LTE, the UE may hand over (e.g., upgrade) the first SIM to VoLTE and, at 930, the UE may continue to support calls on the first SIM (e.g., SIM1 has an active call) and the second SIM (e.g., SIM2 has a held call).

At 932, in response to determining that the first operator RAN does not support LTE, the UE may determine whether LTE is available for the second operator RAN (e.g., RAN2) supporting the second SIM. In other words, the UE may determine whether a cell the UE is camping on and/or attempting to camp on supports LTE.

At 934, in response to determining that the second operator RAN does not support LTE, the UE may continue with the second SIM on IWLAN over cellular using the cellular data connection to the first operator RAN and the UE may follow legacy behavior for the first SIM.

At 936, in response to determining that the second operator RAN does support LTE, the UE may hand over (e.g., upgrade) the second SIM to VoLTE and the UE may follow legacy behavior for the first SIM.

In some embodiments, the WRM module included on (and/or implemented by a processor of) the UE (e.g., UE 106) may determine, based on Wi-Fi availability, to recommend voice over Wi-Fi (VoWiFi) for a first SIM (and/or SIM profile) and voice over LTE (VoLTE) for a second SIM (and/or SIM profile). Thus, the first SIM may be IMS registered over Wi-Fi and the second SIM may be IMS registered over LTE. As noted above, the WRM module may provide recommendations for VoWiFi versus VoLTE as well as Wi-Fi vs cellular data. In some embodiments, a communications module may receive and honor recommendations from the WRM module regarding VoWiFi/VoLTE. Additionally, in some embodiments, the communications module may subscribe to WRM module recommendations regarding Wi-Fi/cellular data. In some embodiments, the first SIM may have an active call via VoWiFi while the second SIM may be idle. Further, as the UE moves from (and/or to a boundary of) Wi-Fi service and to a cellular support service area, Wi-Fi signals may begin to degrade. Hence, the WRM module may recommend the first SIM handover to cellular. Based on the recommendation, the communications module may deregister the second SIM from VoLTE and register to IWLAN over cellular using the first SIM's cellular data. In some embodiments, if (when) the first SIM does not have cellular availability, the second SIM may be deregistered from VoLTE and registered to IWLAN over cellular using its own (SIM2) data. Thus, embodiments may allow active calls on both SIMs (one active and one held) where one is VoWiFi and other is IWLAN over cellular data.

In some embodiments, if (when) both SIMs support VoLTE, a VoWiFi call on the first SIM may be handed over to VoLTE and the second SIM may be unaffected. In some embodiments, if (when) the first SIM supports VoLTE and the second SIM does not support VoLTE, a VoWiFi call on the first SIM may be handed over to VoLTE and the second SIM may be unaffected. In some embodiments, if (when) the first SIM does not support VoLTE and the second SIM does support VoLTE, a VoWiFi call on the first SIM may follow a legacy behavior and the second SIM may hand over (upgrade) to VoLTE. In some embodiments, if (when) neither SIM supports VoLTE, the first SIM may follow a legacy behavior while the second SIM may be unaffected.

Figure 10:
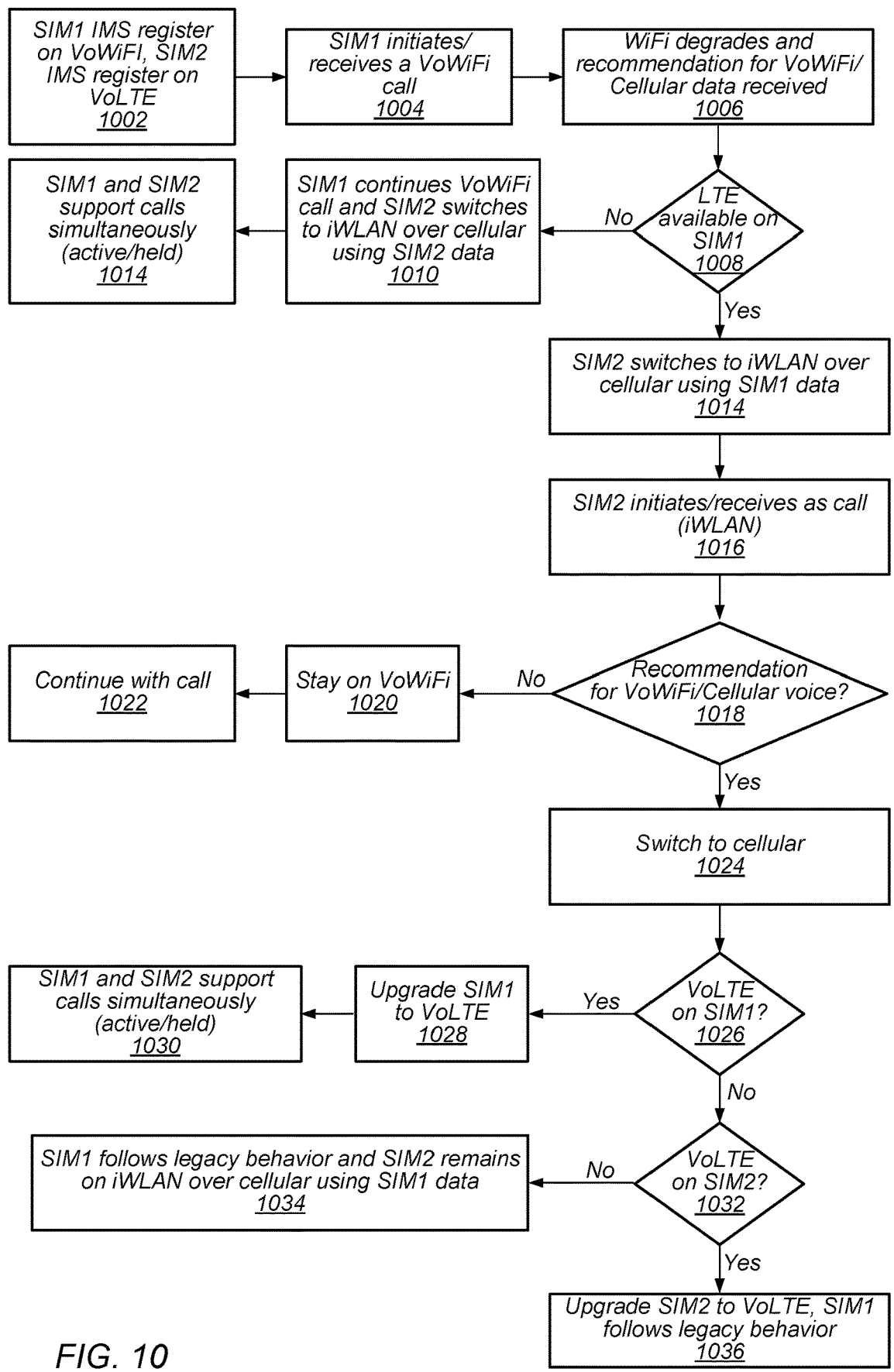

For example, FIG. 10 illustrates a block diagram of another example of a method for a UE to maintain an active VoWiFi call when Wi-Fi degrades, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106, may support and/or include multiple SIMs (and/or multiple SIM profiles), where a first SIM may be IMS registered on VoWiFi and a second SIM may be IMS registered on VoLTE. For example, a first SIM (e.g., SIM1) of the UE may be IMS registered on VoWiFi and may access a first operator radio access network (e.g., RAN1) and a second SIM (e.g., SIM2) of the UE may be IMS registered on VoLTE and may access a second operator RAN (e.g., RAN2). In some embodiments, neither RAN1 or RAN2 may support MOBIKE. The UE may be connected to a core network of the first operator RAN (e.g., RAN1) via a Wi-Fi connection (and/or additionally via a cellular connection).

At 1004, a VoWiFi call may be initiated/received on SIM1. In other words, the UE may receive/initiate a VoWiFi call supported by the first SIM, e.g., a subscription and/or profile associated with the first SIM (e.g., SIM1).

At 1006, the Wi-Fi connection (signal) supporting the VoWiFi may degrade. In some embodiments, a communications module may receive, from a WRM module, a recommendation for VoWiFi versus cellular data. In other words, the WRM module may recommend that SIM1 hand over the VoWiFi call to cellular.

At 1008, the UE may determine whether LTE is available for the first operator RAN (e.g., RAN1) supporting SIM1. In other words, the UE may determine whether a cell the UE is camping on and/or attempting to camp on supports LTE.

At 1010, in response to determining that the first operator RAN does not have LTE available, the UE may continue the VoWiFi call using a cellular data connection to the first operator RAN. Additionally, the UE may deregister the second SIM (SIM2) from VoLTE and register the second SIM to IWLAN over cellular using a cellular data connection to the second operator RAN (e.g., SIM2).

At 1012, the UE may continue to support calls on the first SIM (e.g., SIM1 has an active call) and the second SIM (e.g., SIM2 has a held call).

Alternatively, at 1014, in response to determining that the first operator RAN does support LTE, the UE may deregister the second SIM (e.g., SIM2) from VoLTE and register the second SIM to IWLAN over cellular using the cellular data connection to the first operator RAN (e.g., SIM1).

At 1016, the second SIM may initiate and/or receive a call over IWLAN via the cellular data connection to the first operator RAN.

At 1018, the UE may determine whether the Wi-Fi connection (signal) supporting the VoWiFi is degrading. In some embodiments, a communications module may receive, from a WRM module, a recommendation for VoWiFi versus cellular voice. In other words, the WRM module may recommend that SIM1 hand over the VoWiFi call to cellular.

At 1020, in response to determining that the Wi-Fi connection supporting the VoWiFi call is not degrading, the UE may stay on VoWiFi and, at 1022, continue the call via VoWiFi.

At 1024, in response to determining that the Wi-Fi connection supporting the VoWiFi call is degrading, the UE may switch the first SIM (e.g., SIM1) to a cellular connection.

At 1026, the UE may determine whether LTE is available for the first operator RAN (e.g., RAN1) supporting SIM1. In other words, the UE may determine whether a cell the UE is camping on and/or attempting to camp on supports LTE.

At 1028, in response to determining that the first operator RAN does support LTE, the UE may hand over (e.g., upgrade) the first SIM to VoLTE and, at 1030, the UE may continue to support calls on the first SIM (e.g., SIM1 has an active call) and the second SIM (e.g., SIM2 has a held call).

At 1032, in response to determining that the first operator RAN does not support LTE, the UE may determine whether LTE is available for the second operator RAN (e.g., RAN2) supporting the second SIM. In other words, the UE may determine whether a cell the UE is camping on and/or attempting to camp on supports LTE.

At 1034, in response to determining that the second operator RAN does not support LTE, the UE may continue with the second SIM on IWLAN over cellular using the cellular data connection to the first operator RAN and the UE may follow legacy behavior for the first SIM.

At 1036, in response to determining that the second operator RAN does support LTE, the UE may hand over (e.g., upgrade) the second SIM to VoLTE and the UE may follow legacy behavior for the first SIM.

In some embodiments, the WRM module included on (and/or implemented by a processor of) the UE (e.g., UE 106) may determine, based on Wi-Fi availability, to recommend voice over Wi-Fi (VoWiFi) for a first SIM (and/or SIM profile) and voice over Wi-Fi (VoWiFi) for a second SIM (and/or SIM profile). Thus, the first SIM may be IMS registered over Wi-Fi and the second SIM may be IMS registered over Wi-Fi. In some embodiments, both SIMs may be subscribed to and/or be associated with radio access networks (RANs) that may support MOBIKE. As noted above, the WRM module may provide recommendations for VoWiFi versus VoLTE as well as Wi-Fi vs cellular data. In some embodiments, a communications module may receive and honor recommendations from the WRM module regarding VoWiFi/VoLTE. Additionally, in some embodiments, the communications module may subscribe to WRM module recommendations regarding Wi-Fi/cellular data. In some embodiments, the first SIM may have an active call via VoWiFi while the second SIM may be idle and/or have a VoWiFi call on hold. In some embodiments, once both SIMs are on a VoWiFi call (active and held) Wi-Fi exit/cellular entry criteria may be made more aggressive (e.g., criteria for triggering hand over from Wi-Fi to cellular, such as Wi-Fi signal strength, may be relaxed such that a hand over becomes more likely) for the first SIM, e.g., since the first SIM is supporting an active call. In some embodiments, such a scheme may give handover preference from Wi-Fi to cellular to a SIM with an active Wi-Fi call over a SIM with a held or idle Wi-Fi call. Further, in some embodiments, if both SIMs support and/or have VoLTE available, preference for VoLTE may also be given to the active call. In some embodiments, if (when) the first SIM (supporting an active call) has LTE available, the first SIM may be upgraded/handed over to VoLTE and the held call may be converted to MOBIKE over the first SIM's cellular data. In some embodiments, if (when) the first SIM (supporting an active call) does not have VoLTE available, the second SIM (supporting the held/idle call) may be upgraded to VoLTE and the active call may be converted to MOBIKE over the second SIM's cellular data. In some embodiments, if (when) neither SIM has VoLTE available, both SIMs may be converted to MOBIKE, with priority given to the first SIM (supporting an active call).

Figure 11:
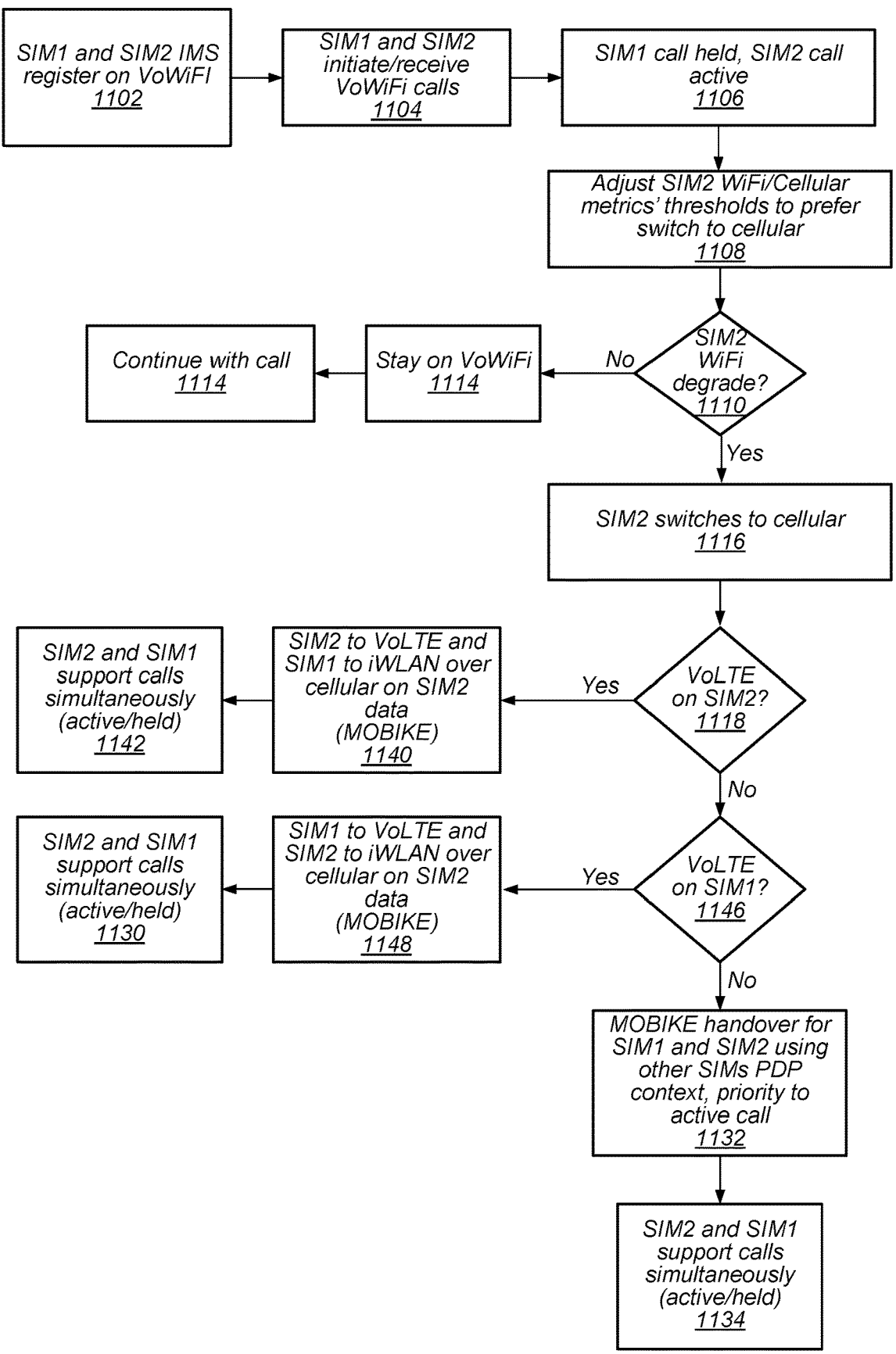

For example, FIG. 11 illustrates a block diagram of another example of a method for a UE to maintain an active VoWiFi call when Wi-Fi degrades, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may support and/or include multiple SIMs (and/or multiple SIM profiles), where a first SIM may be IMS registered on VoWiFi and a second SIM may be IMS registered on VoWiFi. For example, a first SIM (e.g., SIM1) of the UE may be IMS registered on VoWiFi and may access a first operator radio access network (e.g., RAN1) and a second SIM (e.g., SIM2) of the UE may be IMS registered on VoWiFi and may access a second operator RAN (e.g., RAN2). In some embodiments, both RAN1 and RAN2 may support MOBIKE. The UE may be connected to a core network of the first operator RAN (e.g., RAN1) via a Wi-Fi connection (and/or additionally via a cellular connection).

At 1104, a VoWiFi call may be initiated/received on SIM1. In other words, the UE may receive/initiate a VoWiFi call supported by the first SIM, e.g., a subscription and/or profile associated with the first SIM (e.g., SIM1). Additionally, a VoWiFi call may be initiated/received on SIM2. In other words, the UE may receive/initiate a VoWiFi call supported by the second SIM, e.g., a subscription and/or profile associated with the second SIM (e.g., SIM2)

At 1106, the VoWiFi call associated with the first SIM may be held and the VoWiFi call associated with the second SIM may be active.

At 1108, the UE, e.g., a WRM module of the UE, may adjust Wi-Fi/cellular metrics' thresholds of the second SIM such that a stronger preference is given to switching to cellular. In other words, thresholds associated with determining when to handover to cellular from Wi-Fi may be adjusted to increase a likelihood of switching to cellular. For example, a W-Fi signal strength metric may be adjusted such that a handover to cellular may occur at a higher Wi-Fi signal strength for the second SIM as compared to the first SIM. As another example, a cellular signal strength metric may be adjusted such that a handover to cellular may occur at a lower cellular signal strength for the second SIM as compared to the first SIM.

At 1110, the UE may determine whether a Wi-Fi connection (signal) supporting the VoWiFi call on the second SIM (e.g., SIM2) is degrading. In some embodiments, a communications module may receive, from a WRM module, a recommendation for VoWiFi versus cellular data. In other words, the WRM module may recommend that SIM2 hand over the VoWiFi call to cellular.

At 1112, in response to determining that the Wi-Fi signal is not degrading, the UE may remain on Wi-Fi and, at 1114, continue the VoWiFi call on the first SIM as well as the second SIM.

At 1116, in response to determining that the Wi-Fi signal is degrading, the UE may switch the second SIM to cellular data.

At 1118, the UE may determine whether LTE is available for the second operator RAN (e.g., RAN2) supporting SIM2. In other words, the UE may determine whether a cell the UE is camping on and/or attempting to camp on supports LTE.

At 1120, in response to determining that the second operator RAN does support LTE, the UE may handover the second SIM (e.g., SIM2) to VoLTE and hand over the first SIM to IWLAN over cellular using the cellular data connection to the second operator RAN via MOBIKE.

At 1122, the second SIM (active call) and the first SIM (held call) may support calls simultaneously.

At 1126, in response to determining that the second operator RAN does not have LTE available, the UE may determine whether the first operator RAN supporting the first SIM has LTE available.

At 1128, in response to determining that the first operator RAN does support LTE, the UE may handover the first SIM (e.g., SIM1) to VoLTE and hand over the second SIM to IWLAN over cellular using the cellular data connection to the second operator RAN via MOBIKE.

At 1130, the second SIM (active call) and the first SIM (held call) may support calls simultaneously.

At 1132, in response to determining that the second operator RAN does not support LTE, both SIMs may be handed over via MOBIKE with each SIM using the other SIM's PDP context, with priority given to the second SIM based on the active call.

At 1134, the second SIM (active call) and the first SIM (held call) may support calls simultaneously.

In some embodiments, the WRM module included on (and/or implemented by a processor of) the UE (e.g., UE 106) may determine, based on Wi-Fi availability, to recommend voice over Wi-Fi (VoWiFi) for a first SIM (and/or SIM profile) and voice over Wi-Fi (VoWiFi) for a second SIM (and/or SIM profile). Thus, the first SIM may be IMS registered over Wi-Fi and the second SIM may be IMS registered over Wi-Fi. In some embodiments, one of the SIMs may be subscribed to and/or be associated with a radio access networks (RAN) that may support MOBIKE. As noted above, the WRM module may provide recommendations for VoWiFi versus VoLTE as well as Wi-Fi vs cellular data. In some embodiments, a communications module may receive and honor recommendations from the WRM module regarding VoWiFi/VoLTE. Additionally, in some embodiments, the communications module may subscribe to WRM module recommendations regarding Wi-Fi/cellular data. In some embodiments, the first SIM may have an active call via VoWiFi while the second SIM may be idle and/or have a VoWiFi call on hold. In some embodiments, once both SIMs are on a VoWiFi call (active and held) Wi-Fi exit/cellular entry criteria may be made more aggressive (e.g., criteria for triggering hand over from Wi-Fi to cellular, such as Wi-Fi signal strength, may be relaxed such that a hand over becomes more likely) for a SIM that does not support MOBIKE, e.g., since one of the SIMs is not subscribed to and/or associated with a RAN that supports MOBIKE, that SIM may have preference for switching to cellular. In some embodiments, such a scheme may give handover preference from Wi-Fi to cellular to a SIM without MOBIKE support call over a SIM with MOBIKE support. Further, in some embodiments, if both SIMs support and/or have VoLTE available, preference for VoLTE may also be given to the SIM without MOBIKE support. In some embodiments, if (when) the first SIM does not have LTE available and does not have MOBIKE support and the second SIM has LTE available and supports MOBIKE, then first SIM may follow legacy behavior and the second SIM may hand over to VoLTE. In some embodiments, if (when) the first SIM does have VoLTE available but does not have MOBIKE support and the second SIM does not have VoLTE available but does have MOBIKE support, then the first SIM may hand over to VoLTE and the second SIM may use MOBIKE support. In some embodiments, if (when) the first SIM does not have VoLTE available but does not have MOBIKE support and the second SIM does not have VoLTE available but does have MOBIKE support, then the first SIM may follow legacy behavior and the second SIM may use MOBIKE support.

Figure 12:
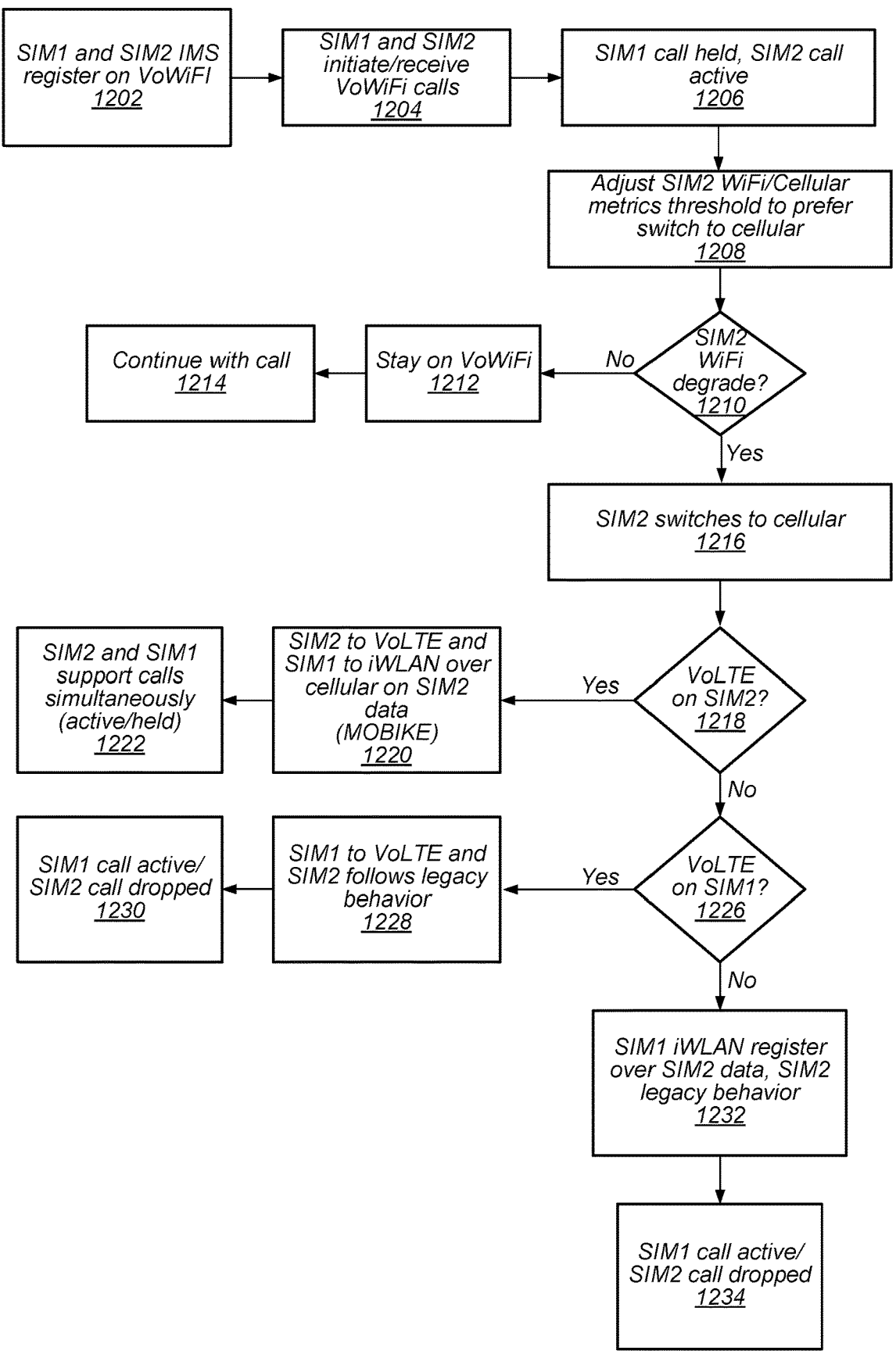

For example, FIG. 12 illustrates a block diagram of another example of a method for a UE to maintain an active VoWiFi call when Wi-Fi degrades, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may support and/or include multiple SIMs (and/or multiple SIM profiles), where a first SIM may be IMS registered on VoWiFi and a second SIM may be IMS registered on VoWiFi. For example, a first SIM (e.g., SIM1) of the UE may be IMS registered on VoWiFi and may access a first operator radio access network (e.g., RAN1) and a second SIM (e.g., SIM2) of the UE may be IMS registered on VoWiFi and may access a second operator RAN (e.g., RAN2). In some embodiments, RAN1 may support MOBIKE and RAN2 may not support MOBIKE. The UE may be connected to a core network of the first operator RAN (e.g., RAN1) via a Wi-Fi connection (and/or additionally via a cellular connection).

At 1204, a VoWiFi call may be initiated/received on SIM1. In other words, the UE may receive/initiate a VoWiFi call supported by the first SIM, e.g., a subscription and/or profile associated with the first SIM (e.g., SIM1). Additionally, a VoWiFi call may be initiated/received on SIM2. In other words, the UE may receive/initiate a VoWiFi call supported by the second SIM, e.g., a subscription and/or profile associated with the second SIM (e.g., SIM2).

At 1206, the VoWiFi call associated with the first SIM may be held and the VoWiFi call associated with the second SIM may be active.

At 1208, the UE, e.g., a WRM module of the UE, may adjust Wi-Fi/cellular metrics' thresholds for the second SIM (e.g., due to lack of MOBIKE support) such that a stronger preference is given to switching to cellular. In other words, thresholds associated with determining when to handover to cellular from Wi-Fi may be adjusted to increase a likelihood of switching to cellular. For example, a Wi-Fi signal strength metric may be adjusted such that a handover to cellular may occur at a higher Wi-Fi signal strength for the second SIM as compared to the first SIM. As another example, a cellular signal strength metric may be adjusted such that a handover to cellular may occur at a lower cellular signal strength for the second SIM as compared to the first SIM.

At 1210, the UE may determine whether Wi-Fi connection (signal) supporting the VoWiFi call on the second SIM (e.g., SIM2) is degrading. In some embodiments, a communications module may receive, from a WRM module, a recommendation for VoWiFi versus cellular data. In other words, the WRM module may recommend that the second SIM hand over the VoWiFi call to cellular.

At 1212, in response to determining that the Wi-Fi signal is not degrading, the UE may remain on Wi-Fi and, at 1214, continue the VoWiFi call on the second SIM.

At 1216, in response to determining that the Wi-Fi signal is degrading, the UE may switch the second SIM to cellular data.

At 1218, the UE may determine whether LTE is available for the second operator RAN (e.g., RAN2) supporting SIM2. In other words, the UE may determine whether a cell the UE is camping on and/or attempting to camp on supports LTE.

At 1220, in response to determining that the second operator RAN does support LTE, the UE may handover the second SIM (e.g., SIM2) to VoLTE and hand over the first SIM to IWLAN over cellular using the cellular data connection to the second operator RAN via MOBIKE.

At 1222, the second SIM (active call) and the first SIM (held call) may support calls simultaneously.

At 1226, in response to determining that the second operator RAN does not have LTE available, the UE may determine whether the first operator RAN supporting the first SIM has LTE available.

At 1228, in response to determining that the first operator RAN does support LTE, the UE may handover the first SIM (e.g., SIM1) to VoLTE and the second SIM may follow legacy behavior.

At 1230, the second SIM may drop the VoWiFi call and the first SIM may continue the call.

At 1232, in response to determining that the first operator RAN does not support LTE, the first SIM may register for IWLAN over the second RAN (e.g., using SIM2's cellular data) and the second SIM may follow legacy behavior.

At 1234, the second SIM may drop the VoWiFi call and the first SIM may continue the call.

Figure 13:
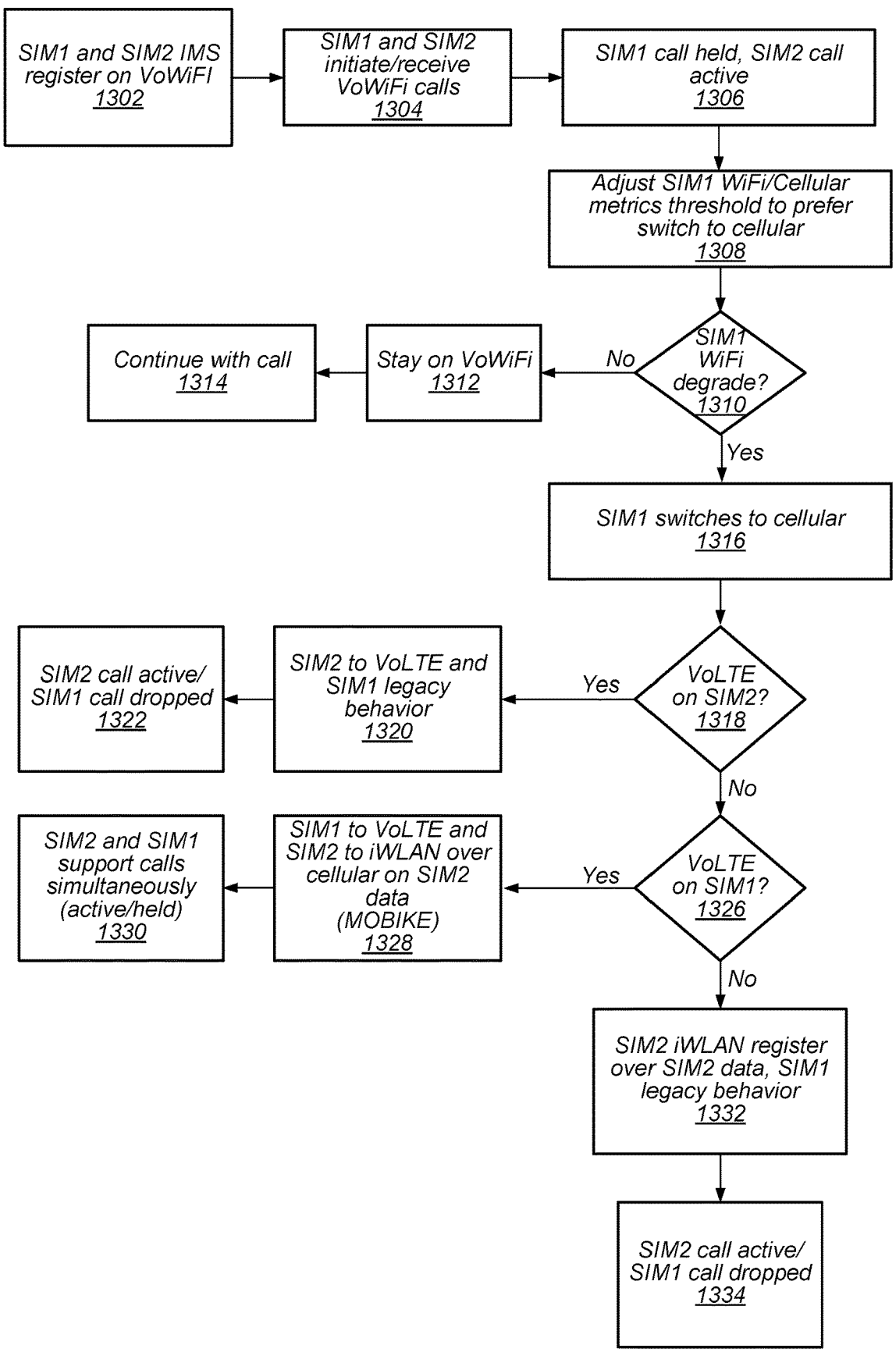

For example, FIG. 13 illustrates a block diagram of another example of a method for a UE to maintain an active VoWiFi call when Wi-Fi degrades, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may support and/or include multiple SIMs (and/or multiple SIM profiles), where a first SIM may be IMS registered on VoWiFi and a second SIM may be IMS registered on VoWiFi. For example, a first SIM (e.g., SIM1) of the UE may be IMS registered on VoWiFi and may access a first operator radio access network (e.g., RAN1) and a second SIM (e.g., SIM2) of the UE may be IMS registered on VoWiFi and may access a second operator RAN (e.g., RAN2). In some embodiments, RAN1 may not support MOBIKE and RAN2 may support MOBIKE. The UE may be connected to a core network of the first operator RAN (e.g., RAN1) via a Wi-Fi connection (and/or additionally via a cellular connection).

At 1304, a VoWiFi call may be initiated/received on SIM1. In other words, the UE may receive/initiate a VoWiFi call supported by the first SIM, e.g., a subscription and/or profile associated with the first SIM (e.g., SIM1). Additionally, a VoWiFi call may be initiated/received on SIM2. In other words, the UE may receive/initiate a VoWiFi call supported by the second SIM, e.g., a subscription and/or profile associated with the second SIM (e.g., SIM2).

At 1306, the VoWiFi call associated with the first SIM may be held and the VoWiFi call associated with the second SIM may be active.

At 1308, the UE, e.g., a WRM module of the UE, may adjust Wi-Fi/cellular metrics' thresholds for the first SIM (e.g., due to lack of MOBIKE support) such that a stronger preference is given to switching to cellular. In other words, thresholds associated with determining when to handover to cellular from Wi-Fi may be adjusted to increase a likelihood of switching to cellular. For example, a Wi-Fi signal strength metric may be adjusted such that a handover to cellular may occur at a higher Wi-Fi signal strength for the first SIM as compared to the second SIM. As another example, a cellular signal strength metric may be adjusted such that a handover to cellular may occur at a lower cellular signal strength for the first SIM as compared to the second SIM.

At 1310, the UE may determine whether Wi-Fi connection (signal) supporting the VoWiFi call on the first SIM (e.g., SIM1) is degrading. In some embodiments, a communications module may receive, from a WRM module, a recommendation for VoWiFi versus cellular data. In other words, the WRM module may recommend that the first SIM hand over the VoWiFi call to cellular.

At 1312, in response to determining that the Wi-Fi signal is not degrading, the UE may remain on Wi-Fi and, at 1314, continue the VoWiFi call on the first SIM.

At 1316, in response to determining that the Wi-Fi signal is degrading, the UE may switch the first SIM to cellular data.

At 1318, the UE may determine whether LTE is available for the second operator RAN (e.g., RAN2) supporting SIM2. In other words, the UE may determine whether a cell the UE is camping on and/or attempting to camp on supports LTE.

At 1320, in response to determining that the second operator RAN does support LTE, the UE may handover the second SIM (e.g., SIM2) to VoLTE and the first SIM may follow legacy behavior.

At 1322, the second SIM (active call) may continue with the VoWiFi call and the first SIM may drop the call.

At 1326, in response to determining that the second operator RAN does not have LTE available, the UE may determine whether the first operator RAN supporting the first SIM (held call) has LTE available.

At 1328, in response to determining that the first operator RAN does support LTE, the UE may handover the first SIM (e.g., SIM1) to VoLTE and the second SIM may register for IWLAN on the second RAN via MOBIKE.

At 1330, the calls may be continued (active and held).

At 1332, in response to determining that the first operator RAN does not support LTE, the second SIM may register for IWLAN over the second RAN (e.g., using SIM2's cellular data) and the first SIM may follow legacy behavior.

At 1334, the second SIM continue the VoWiFi call and the first SIM may drop the call.

Figure 14:
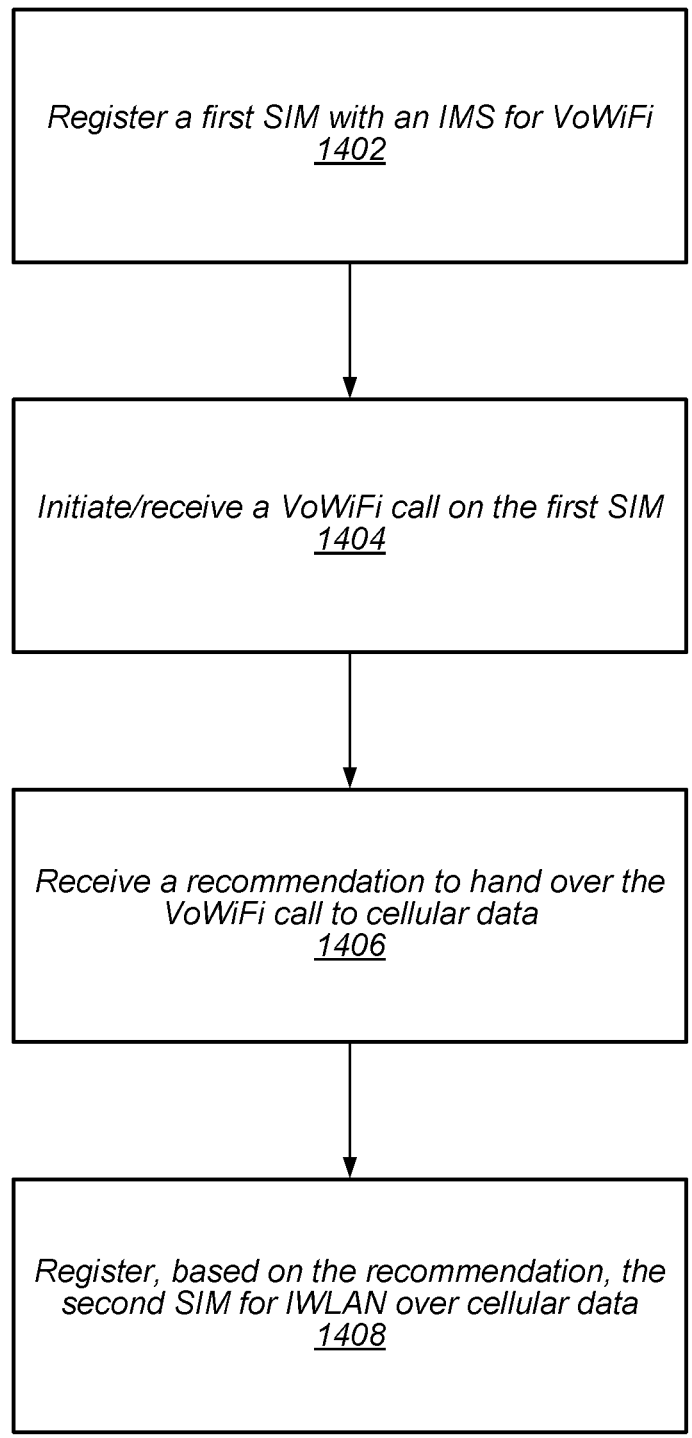
FIG. 14 illustrates a block diagram of an example of a method for handover of a VoWiFi call, according to some embodiments.

FIG. 14 illustrates a block diagram of an example of a method for handover of a VoWiFi call, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may register a first connection supported by a first subscriber identity module (SIM) with an Internet protocol (IP) Multimedia Core Network Subsystem (IMS) for voice over Wi-Fi (VoWiFi) based on a determination to prefer VoWiFi for the first SIM. In some embodiments, the UE may be configured as a dual-SIM/dual standby (DSDS) device. In some embodiments, the first SIM may be associated with a first subscription to a first radio access network (RAN). In some embodiments, the UE may include a second SIM. In some embodiments, the second SIM may be associated with a second subscription to a second RAN. In some embodiments, the first and second RAN may be different. In some embodiments, the first and second RAN may be the same. In some embodiments, the UE may register a second connection associated with the second SIM with the IMS for VoWiFi. In some embodiments, the UE may register the second connection associated with the second SIM with the IMS for voice over LTE (VoLTE).

At 1404, the UE may initiate and/or receive, via the first connection supported by the first SIM, a VoWiFi call. For example, in some embodiments, the UE may receive an indication of an incoming call via VoWiFi, where the incoming call may be associated with the first subscription. As another example, in some embodiments, the UE may initiate an outgoing call via VoWiFi, where the outgoing call may be associated with the first subscription.

At 1406, a recommendation to handover the VoWiFi call from Wi-Fi to cellular data may be received, e.g., by a communications module/manager of the UE.

At 1408, based, at least in part, on the recommendation, a second connection associated with a second SIM may be registered for interworking wireless local area network (IWLAN) over cellular data.

In some embodiments, when the first RAN supports VoLTE, the UE may handover the VoWiFi call to VoLTE. In some embodiments, to register the second SIM for IWLAN over cellular data, the UE may register the second SIM for IWLAN over cellular data using cellular data associated with the first SIM.

In some embodiments, when the first RAN does not support voice over Long Term Evolution (VoLTE) and the second RAN does support VoLTE, the UE upgrade the second SIM to VoLTE.

In some embodiments, the first RAN may support Mobility and Multihoming extension to Internet Key Exchange version 2 IKEv2 (MOBIKE). In such embodiments, the recommendation to handover the VoWiFi call from Wi-Fi to cellular data may be based on an adjusted signal strength threshold. In some embodiments, the adjusted signal strength threshold may increase a probability of recommending handover from Wi-Fi to cellular data based on the first RAN supporting MOBIKE. For example, in some embodiments, a signal strength threshold associated with Wi-Fi signals may be adjusted such that handover to cellular data may be recommended at a higher signal strength as compared to a signal strength metric when the first RAN does not support MOBIKE. In other words, when the UE has knowledge of MOBIKE support, the UE may be more aggressive in handing over to cellular data. In some embodiments, the second RAN may support MOBIKE. In such embodiments, when the first RAN supports VoLTE, the UE may handover the VoWiFi call to VoLTE and, to register the second SIM for IWLAN over cellular data, the UE may register the second SIM for IWLAN via MOBIKE using cellular data associated with the first SIM.

In some embodiments, the second RAN may support MOBIKE and the first RAN may not support MOBIKE. In such embodiments, when the first RAN supports voice over VoLTE, the UE may handover the VoWiFi call to VoLTE and, to register the second SIM for IWLAN over cellular data, the UE may register the second SIM for IWLAN via MOBIKE using cellular data associated with the second SIM.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   a plurality of subscriber identity modules (SIMs), wherein a first SIM of the plurality of SIMs is associated with a first subscription to a first radio access network (RAN), and wherein a second SIM of the plurality of SIMs is associated with a second subscription to a second RAN; and
   one or more processors coupled to the at least one radio, wherein the one or more processors and the at least one radio are configured to perform voice and/or data communications;
   wherein the one or more processors are configured to cause the UE to:
      register a first connection associated with the first SIM with an Internet protocol (IP) Multimedia Core Network Subsystem (IMS) for voice over Wi-Fi (VoWiFi) based on a determination to prefer VoWiFi for the first SIM;
      initiate or receive, via the connection associated with the first SIM, a VoWiFi call;
      receive, based on a degradation in a Wi-Fi signal, a recommendation to handover the VoWiFi call from Wi-Fi to cellular data, wherein the first RAN supports Mobility and Multihoming extension to Internet Key Exchange version 2 IKEv2 (MOBIKE), wherein the recommendation to handover the VoWiFi call from Wi-Fi to cellular data is based on an adjusted signal strength threshold, and wherein the adjusted signal strength threshold increases the probability of recommending handover from Wi-Fi to cellular data based on the first RAN supporting MOBIKE; and
      based, at least in part, on the recommendation, register the second SIM for interworking wireless local area network (IWLAN) over cellular data.

2. The UE of claim 1,
   wherein, when the first RAN supports voice over Long Term Evolution (VoLTE), the one or more processors are further configured to handover the VoWiFi call to VoLTE.

3. The UE of claim 2,
   wherein, to register the second SIM for IWLAN over cellular data, the one or more processors are further configured to register the second SIM for IWLAN over cellular data using cellular data associated with the first SIM.

4. The UE of claim 1,
   wherein, when the first RAN does not support voice over Long Term Evolution (VoLTE) and the second RAN does support VoLTE, the one or more processors are further configured to upgrade the second SIM to VoLTE.

5. The UE of claim 1,
   wherein the one or more processors are further configured to:
      register the second SIM with the IMS for voice over Long Term Evolution (VoLTE).

6. The UE of claim 1,
   wherein the one or more processors are further configured to:
      register the second SIM with the IMS for VoWiFi.

7. The UE of claim 1,
   wherein the second RAN supports MOBIKE;
   wherein, when the first RAN supports voice over Long Term Evolution (VoLTE), the one or more processors are further configured to handover the VoWiFi call to VoLTE; and
   wherein, to register the second SIM for IWLAN over cellular data, the one or more processors are further configured to register the second SIM for IWLAN via MOBIKE using cellular data associated with the first SIM.

8. The UE of claim 1,
   wherein the second RAN supports Mobility and Multihoming extension to Internet Key Exchange version 2 IKEv2 (MOBIKE) and the first RAN does not support MOBIKE;
   wherein, when the first RAN supports voice over Long Term Evolution (VoLTE), the one or more processors are further configured to handover the VoWiFi call to VoLTE; and
   wherein, to register the second SIM for IWLAN over cellular data, the one or more processors are further configured to register the second SIM for IWLAN via MOBIKE using cellular data associated with the second SIM.

9. An apparatus, comprising:
   a memory; and
   a processing element in communication with the memory, wherein the processing element is configured to:
      register a first connection associated with a first subscriber identity module (SIM) with an Internet protocol (IP) Multimedia Core Network Subsystem (IMS) for voice over Wi-Fi (VoWiFi) based on a determination to prefer VoWiFi for the first SIM, wherein the first SIM is associated with a first subscription to a first radio access network (RAN);
      initiate or receive, via the first connection associated with the first SIM, a VoWiFi call;
      receive, based on a degradation in a Wi-Fi signal, a recommendation to handover the VoWiFi call from Wi-Fi to cellular data, wherein the first RAN supports Mobility and Multihoming extension to Internet Key Exchange version 2 IKEv2 (MOBIKE), wherein the recommendation to handover the VoWiFi call from Wi-Fi to cellular data is based on an adjusted signal strength threshold, and wherein the adjusted signal strength threshold increases the probability of recommending handover from Wi-Fi to cellular data based on the first RAN supporting MOBIKE; and
      based, at least in part, on the recommendation, register a second connection associated with a second SIM for interworking wireless local area network (IWLAN) over cellular data, wherein the second SIM is associated with a second subscription to a second RAN.

10. The apparatus of claim 9,
    wherein, when the first RAN supports voice over Long Term Evolution (VoLTE), the processing element is further configured to handover the VoWiFi call to VoLTE.

11. The apparatus of claim 10,
    wherein, to register the second SIM for IWLAN over cellular data, the processing element is further configured to register the second SIM for IWLAN over cellular data using cellular data associated with the first SIM.

12. The apparatus of claim 9,
wherein, when the first RAN does not support voice over Long Term Evolution (VoLTE) and the second RAN does support VoLTE, the processing element is further configured to upgrade the second SIM to VoLTE.

13. The apparatus of claim 9,
wherein the processing element is further configured to:
register the second SIM with the IMS for voice over Long Term Evolution (VoLTE).

14. The apparatus of claim 9,
wherein the processing element is further configured to:
register the second SIM with the IMS for VoWiFi.

15. A non-transitory computer readable memory medium storing program instructions executable by processing circuitry to cause a user equipment device (UE) to:
register a first connection associated with a first subscriber identity module (SIM) with an Internet protocol (IP) Multimedia Core Network Subsystem (IMS) for voice over Wi-Fi (VoWiFi) based on a determination to prefer VoWiFi for the first SIM, wherein the first SIM is associated with a first subscription to a first radio access network (RAN);
initiate or receive, via the first connection associated with the first SIM, a VoWiFi call;
receive, based on a degradation in a Wi-Fi signal, a recommendation to handover the VoWiFi call from Wi-Fi to cellular data, wherein the first RAN supports Mobility and Multihoming extension to Internet Key Exchange version 2 IKEv2 (MOBIKE), wherein the recommendation to handover the VoWiFi call from Wi-Fi to cellular data is based on an adjusted signal strength threshold, and wherein the adjusted signal strength threshold increases the probability of recommending handover from Wi-Fi to cellular data based on the first RAN supporting MOBIKE; and
based, at least in part, on the recommendation, register a second connection associated with a second SIM for interworking wireless local area network (IWLAN) over cellular data, wherein the second SIM is associated with a second subscription to a second RAN.

16. The non-transitory computer readable memory medium of claim 15,
wherein the second RAN supports MOBIKE;
wherein, when the first RAN supports voice over Long Term Evolution (VoLTE), the program instructions are further configured to handover the VoWiFi call to VoLTE; and
wherein, to register the second SIM for IWLAN over cellular data, the program instructions are further configured to register the second SIM for IWLAN via MOBIKE using cellular data associated with the first SIM.

17. The non-transitory computer readable memory medium of claim 15,
wherein the second RAN supports MOBIKE and the first RAN does not support MOBIKE;
wherein, when the first RAN supports voice over Long Term Evolution (VoLTE), the program instructions are further configured to handover the VoWiFi call to VoLTE; and
wherein, to register the second SIM for IWLAN over cellular data, the program instructions are further configured to register the second SIM for IWLAN via MOBIKE using cellular data associated with the second SIM.

18. The non-transitory computer readable memory medium of claim 15
wherein, when the first RAN supports voice over Long Term Evolution (VoLTE), the program instructions are further configured to handover the VoWiFi call to VoLTE.

19. The non-transitory computer readable memory medium of claim 15
wherein, to register the second SIM for IWLAN over cellular data, the program instructions are further configured to register the second SIM for IWLAN over cellular data using cellular data associated with the first SIM.

20. The non-transitory computer readable memory medium of claim 15
wherein, when the first RAN does not support voice over Long Term Evolution (VoLTE) and the second RAN does support VoLTE, the program instructions are further configured to upgrade the second SIM to VoLTE.

* * * * *